US012687917B2

(12) United States Patent
Kim et al.

(10) Patent No.: US 12,687,917 B2
(45) Date of Patent: Jul. 21, 2026

(54) IMAGE CONTENT TRANSMISSION METHOD AND APPARATUS USING EDGE COMPUTING SERVICE

(71) Applicant: SAMSUNG ELECTRONICS CO., LTD., Suwon-si (KR)

(72) Inventors: Seohyang Kim, Suwon-si (KR); Jiwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 17/987,738

(22) Filed: Nov. 15, 2022

(65) Prior Publication Data

US 2023/0076650 A1 Mar. 9, 2023

Related U.S. Application Data

(63) Continuation of application No. PCT/KR2021/006100, filed on May 14, 2021.

(60) Provisional application No. 63/025,389, filed on May 15, 2020.

(30) Foreign Application Priority Data

Sep. 25, 2020 (KR) ........................ 10-2020-0125087

(51) Int. Cl.
*G06F 3/01* (2006.01)
*A63F 13/525* (2014.01)

(52) U.S. Cl.
CPC ............ *G06F 3/011* (2013.01); *A63F 13/525* (2014.09)

(58) Field of Classification Search
None
See application file for complete search history.

(56) References Cited

U.S. PATENT DOCUMENTS 7,679,622 B2 3/2010 Lee et al.
8,856,624 B1 * 10/2014 Paniconi .............. H04L 1/0009
                                                714/752
9,451,248 B2 * 9/2016 Imai ................. H04N 21/23611
9,821,222 B1 * 11/2017 Energin ................ A63F 13/355
(Continued)

FOREIGN PATENT DOCUMENTS

CN 101969372 2/2011
CN 110391879 10/2019
(Continued)

OTHER PUBLICATIONS

Yang, S. et al., FoVR: Attention-based VR Streaming through Bandwidth-limited Wireless Networks, IEEE SECON 2019 (Jun. 10-13, 2019), 9 pages.
(Continued)

*Primary Examiner* — Seng H Lim
(74) *Attorney, Agent, or Firm* — Nixon & Vanderhye, P.C.

(57) ABSTRACT

An example image content transmission method, performed by an edge data network, includes: transmitting, to an electronic device, user field-of-view image packets including user field-of-view frame packets including information about a first user field-of-view frame, and first transmission error control packets; and transmitting, to the electronic device, extra field-of-view image packets including extra field-of-view frame packets including information about the first extra field-of-view frame, and second transmission error control packets.

16 Claims, 19 Drawing Sheets

(56) References Cited

U.S. PATENT DOCUMENTS

| | | | | |
|---|---|---|---|---|
| 10,447,430 | B2 * | 10/2019 | Low | H04L 1/0045 |
| 10,514,541 | B2 | 12/2019 | Tantos et al. | |
| 10,543,430 | B2 * | 1/2020 | Osman | A63F 13/355 |
| 10,560,759 | B1 * | 2/2020 | Liu | H04N 21/816 |
| 10,659,190 | B1 * | 5/2020 | Liu | H04L 1/0018 |
| 10,812,828 | B2 * | 10/2020 | Han | H04N 19/174 |
| 11,546,397 | B2 * | 1/2023 | Dvir | H04N 5/2628 |
| 11,563,513 | B1 * | 1/2023 | Lohr | G06F 3/011 |
| 11,711,505 | B2 * | 7/2023 | Mate | H04N 13/194 |
| | | | | 348/43 |
| 12,058,392 | B2 * | 8/2024 | Lee | H04N 21/234345 |
| 2003/0120802 | A1 | 6/2003 | Kohno | |
| 2010/0067578 | A1 | 3/2010 | Nakagawa | |
| 2012/0179947 | A1 * | 7/2012 | Kato | H03M 13/635 |
| | | | | 714/E11.023 |
| 2013/0141523 | A1 * | 6/2013 | Banta | H04N 21/4728 |
| | | | | 348/36 |
| 2015/0181460 | A1 | 6/2015 | Subramanian et al. | |
| 2015/0379772 | A1 * | 12/2015 | Hoffman | G02B 27/0093 |
| | | | | 345/633 |
| 2017/0289219 | A1 * | 10/2017 | Khalid | H04L 67/131 |
| 2018/0034583 | A1 | 2/2018 | Low et al. | |
| 2018/0160119 | A1 * | 6/2018 | Su | H04N 19/597 |
| 2018/0239420 | A1 * | 8/2018 | Inomata | G06F 3/012 |
| 2019/0164468 | A1 | 5/2019 | Jung | |
| 2019/0313119 | A1 | 10/2019 | Han et al. | |
| 2019/0356894 | A1 * | 11/2019 | Oh | H04N 21/234345 |
| 2020/0007905 | A1 * | 1/2020 | Han | H04L 41/0803 |
| 2020/0045288 | A1 * | 2/2020 | Boyce | H04N 13/167 |
| 2020/0081431 | A1 | 3/2020 | Weiss | |
| 2020/0128280 | A1 * | 4/2020 | Han | H04N 21/251 |
| 2020/0145729 | A1 * | 5/2020 | Liu | H04L 65/612 |
| 2020/0204841 | A1 | 6/2020 | Van Brandenburg et al. | |
| 2020/0409457 | A1 * | 12/2020 | Terrano | G06F 3/013 |
| 2021/0129019 | A1 * | 5/2021 | Colenbrander | H04L 65/765 |
| 2021/0240257 | A1 * | 8/2021 | Mironov | G06F 3/012 |
| 2021/0274155 | A1 * | 9/2021 | Yun | H04N 13/194 |
| 2021/0312677 | A1 * | 10/2021 | Albrecht | H04W 4/021 |
| 2022/0191453 | A1 * | 6/2022 | Wang | H04N 21/234327 |
| 2023/0011586 | A1 * | 1/2023 | Hari Haran | H04N 13/349 |
| 2023/0079171 | A1 * | 3/2023 | Kim | G06V 10/24 |
| | | | | 382/103 |
| 2023/0215003 | A1 | 7/2023 | Tsujimoto | |

FOREIGN PATENT DOCUMENTS

| | | |
|---|---|---|
| CN | 110557677 | 12/2019 |
| CN | 111052754 | 4/2020 |
| KR | 10-2010-0092993 | 8/2010 |
| KR | 10-2017-0120972 | 11/2017 |
| KR | 10-2019-0074267 | 6/2019 |
| KR | 10-2022421 | 9/2019 |
| KR | 10-2028997 | 10/2019 |
| KR | 10-2046713 | 11/2019 |
| KR | 10-2021-0142520 | 11/2021 |

OTHER PUBLICATIONS

Cisco, Cisco Annual Internet Report (2018-2023) White Paper, Mar. 2020 (Mar. 9, 2020), 35 pages.

Bao, Y. et al., Shooting a Moving Target: Motion-Prediction-Based Transmission for 360-Degree Videos, IEEE BigData 2016 (Dec. 5-8, 2016), 11 pages.

Sun, K. et al., Delay-Aware Fountain Codes for Video Streaming with Optimal Sampling Strategy, Journal of Commmunications and Networks, vol. 21, No. 4, Aug. 2019, 12 pages.

Ahmad, S., et al., Robust Live Unicast Video Streaming with Rateless Codes, IEEE Packet Video, (Nov. 12-13, 2007), 8 pages.

Shan, Y. et al., Scalable Video streaming with Fine-Grain Adaptive Forward Error Correction, IEEE Transactions on Circuits and Systems for Video Technology, vol. 19, No. 9, Sep. 2009, 13 pages.

Huang, H., Adaptive Forward Error Correction with Cognitive Technology Mechanism for Video Streaming over Wireless Networks, IEEE 3CA 2010 (May 5-7, 2010), 4 pages.

Tsai, M., et al., Burst-aware Adaptive Forward Error Correction in Video Streaming over Wireless Networks, IEEE HPCC 2008 (Sep. 25-27, 2008), 4 pages.

Lv, Y. et al., Unequal Error Protection for 360 VR Video Based on Expanding Window Fountain Codes, IEEE IC-NIDC 2018 (Aug. 22-24, 2018), 5 pages.

Li, Z., et al., Dante: Enabling FoV-Aware Adaptive FEC Coding for 360-Degree Video Streaming, ACM APNet 2018 (Aug. 1, 2018), 8 pages.

Mahzari, A. et al., FoV-Aware Edge Caching for Adaptive 360 Video Streaming, ACM MM (Oct. 15, 2018), 9 pages.

Hosseini, M., View-Aware Tile-Based Adaptations in 360 Virtual Reality Video Streaming, IEEE VR (Mar. 18-22, 2017), 3 pages.

Ma, L. et al., Buffer Control in VR Video Transmission over MMT System, IEEE BMSB (Jun. 6-8, 2018), 5 pages.

Office Action dated Jun. 21, 2024 in Korean Patent Application No. 10-2020-0125087 and English-language translation.

Office Action dated Aug. 14, 2024 in Chinese Patent Application No. 202180035519.1 and English-language translation.

International Search Report (with translation) for PCT/KR2021/006100, dated Aug. 12, 2021, 6 pages.

Abubakar, Umar Sadiq, "3D Multiple Description Coding for Error Resilience over Wireless Networks", Thesis submitted for the degree of doctor of Philosophy, Sep. 1, 2011, 245 pages.

Doan, Tung V et al, "MEC-assisted Immersive Services: Orchestration Framework and Protocol", 2019 IEEE International Symposium on BMSB, Jun. 5, 2019, 6 pages.

Koch, Christian et al., Increasing the Quality of 360 Video Streaming by Transitioning between Viewport Quality Adaptation Mechanisms, arXiv: 1910.02397v1 [cs.NI] Oct. 6, 2019, 13 pages.

Corbillon, Xavier et al, "Viewport-Adaptive Navigable 360-Degree Video Delivery", IEEE ICC 2017 Communications Software, Services, and Multimedia Applications Symposium, May 21, 2017, 7 pages.

Maha Abdallah et al., "Delay-Sensitive Video Computing in the Cloud: A Survey", ACM Trans. Multimedia Comput. Commun. Appl., vol. 14, No. 3s, Article 54 (Jun. 2018), 29 pages.

Extended Search Report dated Sep. 21, 2023 in European Patent Application No. 21805159.7.

Office Action dated Feb. 5, 2025 in Chinese Patent Application No. 202180035519.1 and English-language translation.

Written Decision on Registration dated Feb. 24, 2025 in Korean Patent Application No. 10-2020-0125087 and English-language translation.

Communication pursuant to Article 94(3) EPC dated Mar. 4, 2025 European Patent Application No. 21805159.7.

Notice of Allowance dated Jun. 16, 2025 Chinese Patent Application No. 202180035519.1.

Office Action issued Apr. 21, 2026 in Indian Patent Application No. 202237066701 and English-language translation.

* cited by examiner

FIG. 8A

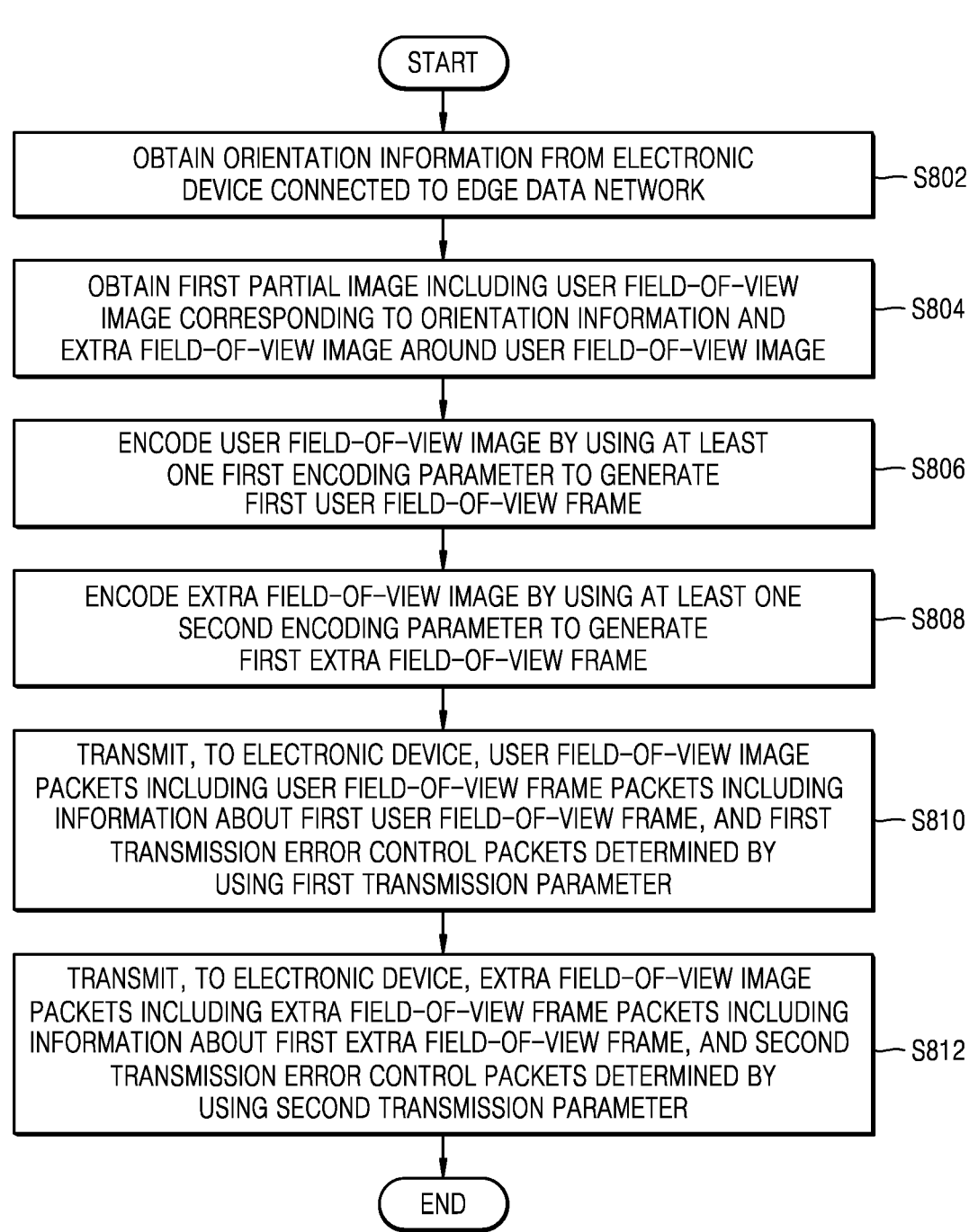

START

OBTAIN ORIENTATION INFORMATION FROM ELECTRONIC DEVICE CONNECTED TO EDGE DATA NETWORK — S802

OBTAIN FIRST PARTIAL IMAGE INCLUDING USER FIELD-OF-VIEW IMAGE CORRESPONDING TO ORIENTATION INFORMATION AND EXTRA FIELD-OF-VIEW IMAGE AROUND USER FIELD-OF-VIEW IMAGE — S804

ENCODE USER FIELD-OF-VIEW IMAGE BY USING AT LEAST ONE FIRST ENCODING PARAMETER TO GENERATE FIRST USER FIELD-OF-VIEW FRAME — S806

ENCODE EXTRA FIELD-OF-VIEW IMAGE BY USING AT LEAST ONE SECOND ENCODING PARAMETER TO GENERATE FIRST EXTRA FIELD-OF-VIEW FRAME — S808

TRANSMIT, TO ELECTRONIC DEVICE, USER FIELD-OF-VIEW IMAGE PACKETS INCLUDING USER FIELD-OF-VIEW FRAME PACKETS INCLUDING INFORMATION ABOUT FIRST USER FIELD-OF-VIEW FRAME, AND FIRST TRANSMISSION ERROR CONTROL PACKETS DETERMINED BY USING FIRST TRANSMISSION PARAMETER — S810

TRANSMIT, TO ELECTRONIC DEVICE, EXTRA FIELD-OF-VIEW IMAGE PACKETS INCLUDING EXTRA FIELD-OF-VIEW FRAME PACKETS INCLUDING INFORMATION ABOUT FIRST EXTRA FIELD-OF-VIEW FRAME, AND SECOND TRANSMISSION ERROR CONTROL PACKETS DETERMINED BY USING SECOND TRANSMISSION PARAMETER — S812

END

FIG. 8B

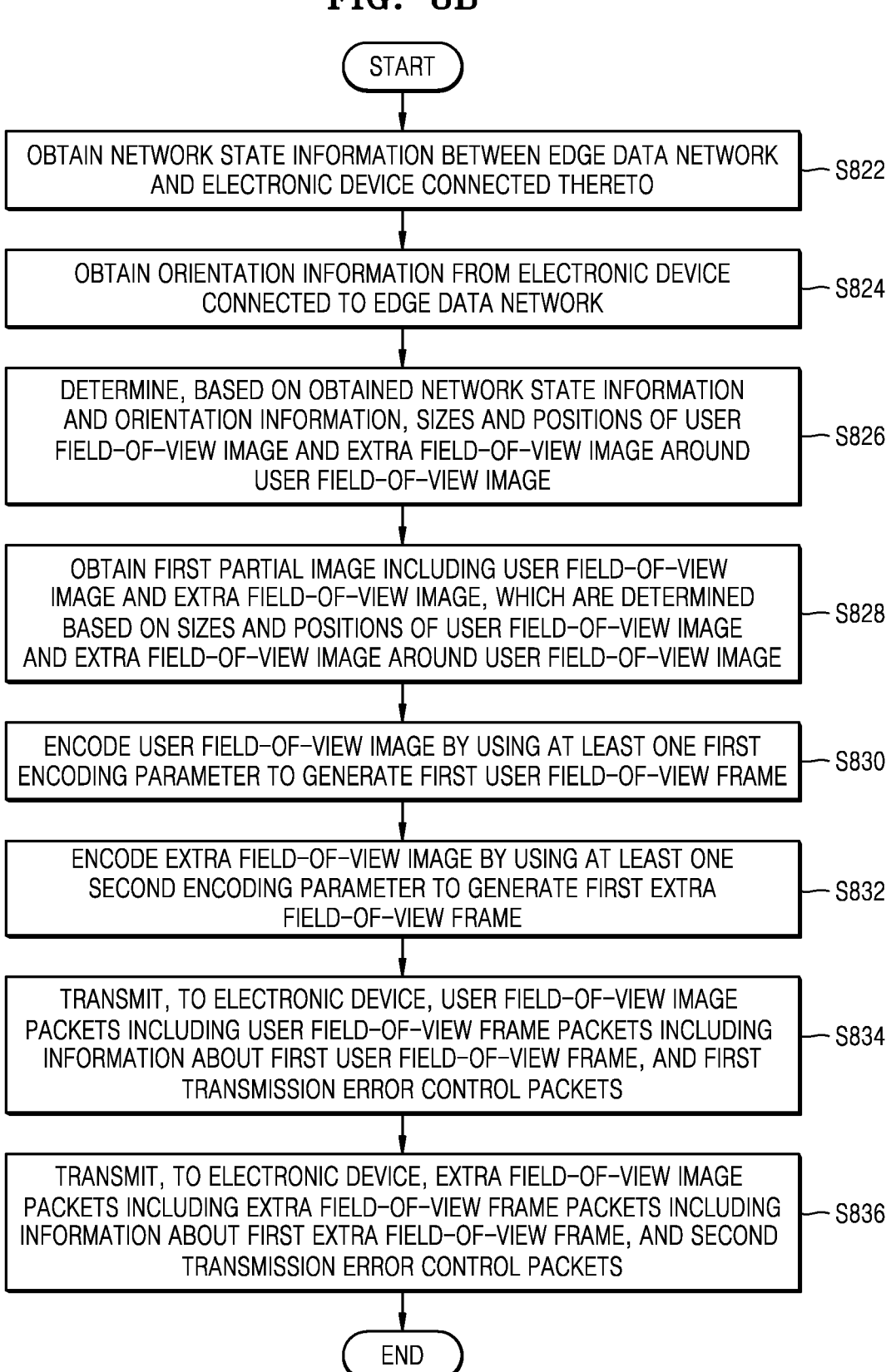

START

OBTAIN NETWORK STATE INFORMATION BETWEEN EDGE DATA NETWORK AND ELECTRONIC DEVICE CONNECTED THERETO — S822

OBTAIN ORIENTATION INFORMATION FROM ELECTRONIC DEVICE CONNECTED TO EDGE DATA NETWORK — S824

DETERMINE, BASED ON OBTAINED NETWORK STATE INFORMATION AND ORIENTATION INFORMATION, SIZES AND POSITIONS OF USER FIELD-OF-VIEW IMAGE AND EXTRA FIELD-OF-VIEW IMAGE AROUND USER FIELD-OF-VIEW IMAGE — S826

OBTAIN FIRST PARTIAL IMAGE INCLUDING USER FIELD-OF-VIEW IMAGE AND EXTRA FIELD-OF-VIEW IMAGE, WHICH ARE DETERMINED BASED ON SIZES AND POSITIONS OF USER FIELD-OF-VIEW IMAGE AND EXTRA FIELD-OF-VIEW IMAGE AROUND USER FIELD-OF-VIEW IMAGE — S828

ENCODE USER FIELD-OF-VIEW IMAGE BY USING AT LEAST ONE FIRST ENCODING PARAMETER TO GENERATE FIRST USER FIELD-OF-VIEW FRAME — S830

ENCODE EXTRA FIELD-OF-VIEW IMAGE BY USING AT LEAST ONE SECOND ENCODING PARAMETER TO GENERATE FIRST EXTRA FIELD-OF-VIEW FRAME — S832

TRANSMIT, TO ELECTRONIC DEVICE, USER FIELD-OF-VIEW IMAGE PACKETS INCLUDING USER FIELD-OF-VIEW FRAME PACKETS INCLUDING INFORMATION ABOUT FIRST USER FIELD-OF-VIEW FRAME, AND FIRST TRANSMISSION ERROR CONTROL PACKETS — S834

TRANSMIT, TO ELECTRONIC DEVICE, EXTRA FIELD-OF-VIEW IMAGE PACKETS INCLUDING EXTRA FIELD-OF-VIEW FRAME PACKETS INCLUDING INFORMATION ABOUT FIRST EXTRA FIELD-OF-VIEW FRAME, AND SECOND TRANSMISSION ERROR CONTROL PACKETS — S836

END

FIG. 9

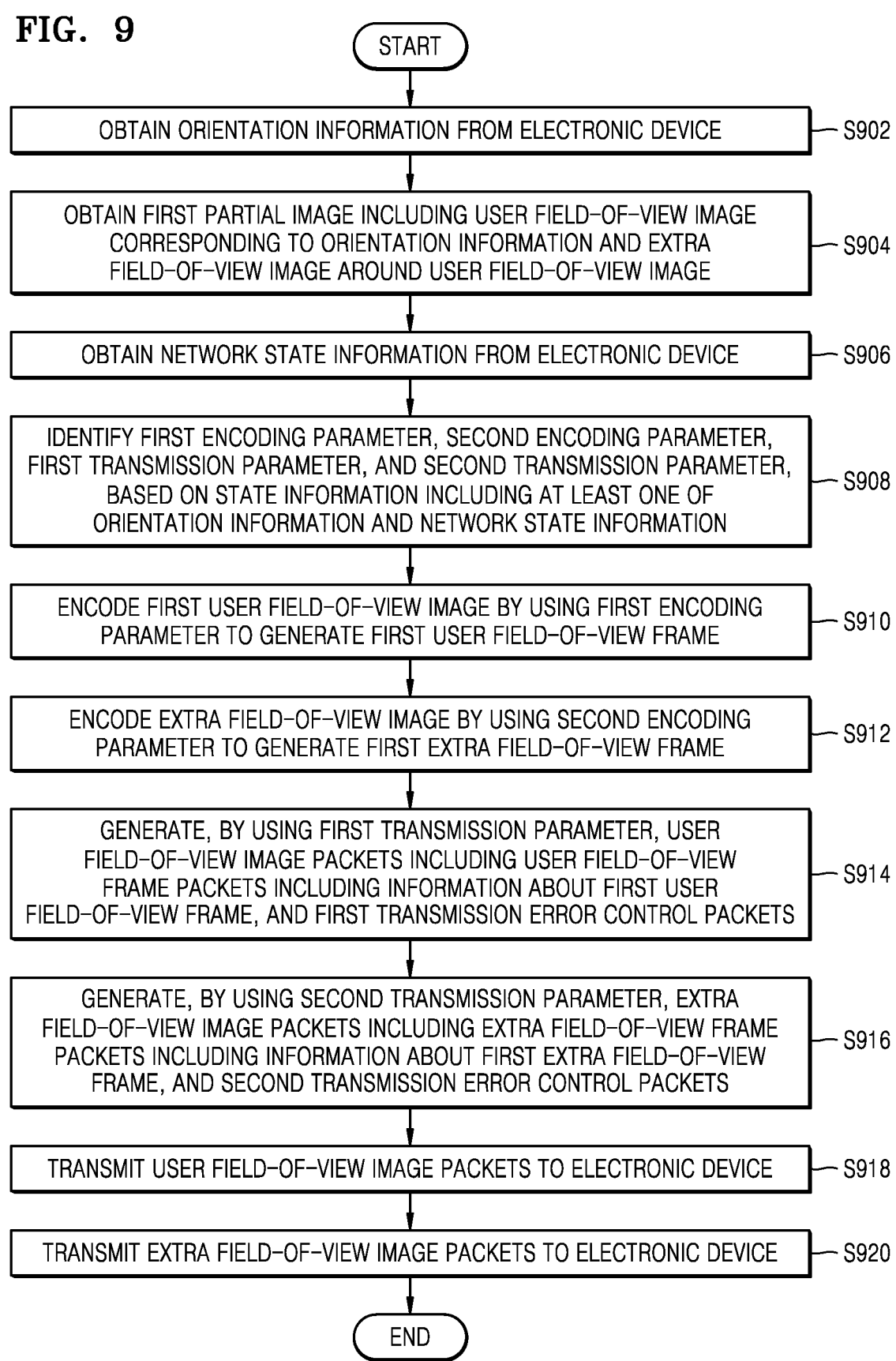

START

OBTAIN ORIENTATION INFORMATION FROM ELECTRONIC DEVICE —— S902

OBTAIN FIRST PARTIAL IMAGE INCLUDING USER FIELD-OF-VIEW IMAGE
CORRESPONDING TO ORIENTATION INFORMATION AND EXTRA
FIELD-OF-VIEW IMAGE AROUND USER FIELD-OF-VIEW IMAGE —— S904

OBTAIN NETWORK STATE INFORMATION FROM ELECTRONIC DEVICE —— S906

IDENTIFY FIRST ENCODING PARAMETER, SECOND ENCODING PARAMETER,
FIRST TRANSMISSION PARAMETER, AND SECOND TRANSMISSION PARAMETER,
BASED ON STATE INFORMATION INCLUDING AT LEAST ONE OF
ORIENTATION INFORMATION AND NETWORK STATE INFORMATION —— S908

ENCODE FIRST USER FIELD-OF-VIEW IMAGE BY USING FIRST ENCODING
PARAMETER TO GENERATE FIRST USER FIELD-OF-VIEW FRAME —— S910

ENCODE EXTRA FIELD-OF-VIEW IMAGE BY USING SECOND ENCODING
PARAMETER TO GENERATE FIRST EXTRA FIELD-OF-VIEW FRAME —— S912

GENERATE, BY USING FIRST TRANSMISSION PARAMETER, USER
FIELD-OF-VIEW IMAGE PACKETS INCLUDING USER FIELD-OF-VIEW
FRAME PACKETS INCLUDING INFORMATION ABOUT FIRST USER
FIELD-OF-VIEW FRAME, AND FIRST TRANSMISSION ERROR CONTROL PACKETS —— S914

GENERATE, BY USING SECOND TRANSMISSION PARAMETER, EXTRA
FIELD-OF-VIEW IMAGE PACKETS INCLUDING EXTRA FIELD-OF-VIEW FRAME
PACKETS INCLUDING INFORMATION ABOUT FIRST EXTRA FIELD-OF-VIEW
FRAME, AND SECOND TRANSMISSION ERROR CONTROL PACKETS —— S916

TRANSMIT USER FIELD-OF-VIEW IMAGE PACKETS TO ELECTRONIC DEVICE —— S918

TRANSMIT EXTRA FIELD-OF-VIEW IMAGE PACKETS TO ELECTRONIC DEVICE —— S920

END

FIG. 10

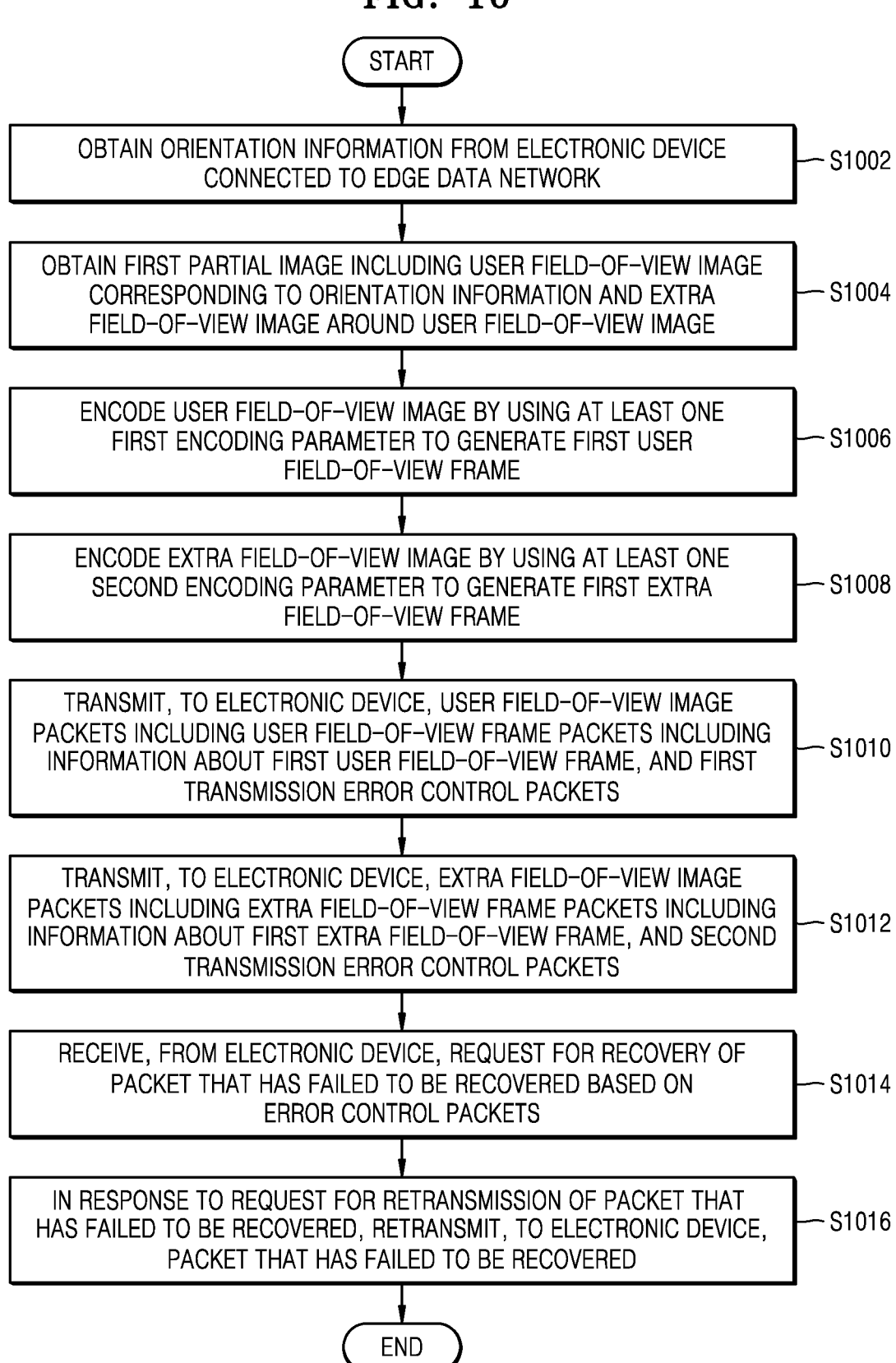

START

OBTAIN ORIENTATION INFORMATION FROM ELECTRONIC DEVICE
CONNECTED TO EDGE DATA NETWORK — S1002

OBTAIN FIRST PARTIAL IMAGE INCLUDING USER FIELD-OF-VIEW IMAGE
CORRESPONDING TO ORIENTATION INFORMATION AND EXTRA
FIELD-OF-VIEW IMAGE AROUND USER FIELD-OF-VIEW IMAGE — S1004

ENCODE USER FIELD-OF-VIEW IMAGE BY USING AT LEAST ONE
FIRST ENCODING PARAMETER TO GENERATE FIRST USER
FIELD-OF-VIEW FRAME — S1006

ENCODE EXTRA FIELD-OF-VIEW IMAGE BY USING AT LEAST ONE
SECOND ENCODING PARAMETER TO GENERATE FIRST EXTRA
FIELD-OF-VIEW FRAME — S1008

TRANSMIT, TO ELECTRONIC DEVICE, USER FIELD-OF-VIEW IMAGE
PACKETS INCLUDING USER FIELD-OF-VIEW FRAME PACKETS INCLUDING
INFORMATION ABOUT FIRST USER FIELD-OF-VIEW FRAME, AND FIRST
TRANSMISSION ERROR CONTROL PACKETS — S1010

TRANSMIT, TO ELECTRONIC DEVICE, EXTRA FIELD-OF-VIEW IMAGE
PACKETS INCLUDING EXTRA FIELD-OF-VIEW FRAME PACKETS INCLUDING
INFORMATION ABOUT FIRST EXTRA FIELD-OF-VIEW FRAME, AND SECOND
TRANSMISSION ERROR CONTROL PACKETS — S1012

RECEIVE, FROM ELECTRONIC DEVICE, REQUEST FOR RECOVERY OF
PACKET THAT HAS FAILED TO BE RECOVERED BASED ON
ERROR CONTROL PACKETS — S1014

IN RESPONSE TO REQUEST FOR RETRANSMISSION OF PACKET THAT
HAS FAILED TO BE RECOVERED, RETRANSMIT, TO ELECTRONIC DEVICE,
PACKET THAT HAS FAILED TO BE RECOVERED — S1016

END

FIG. 11

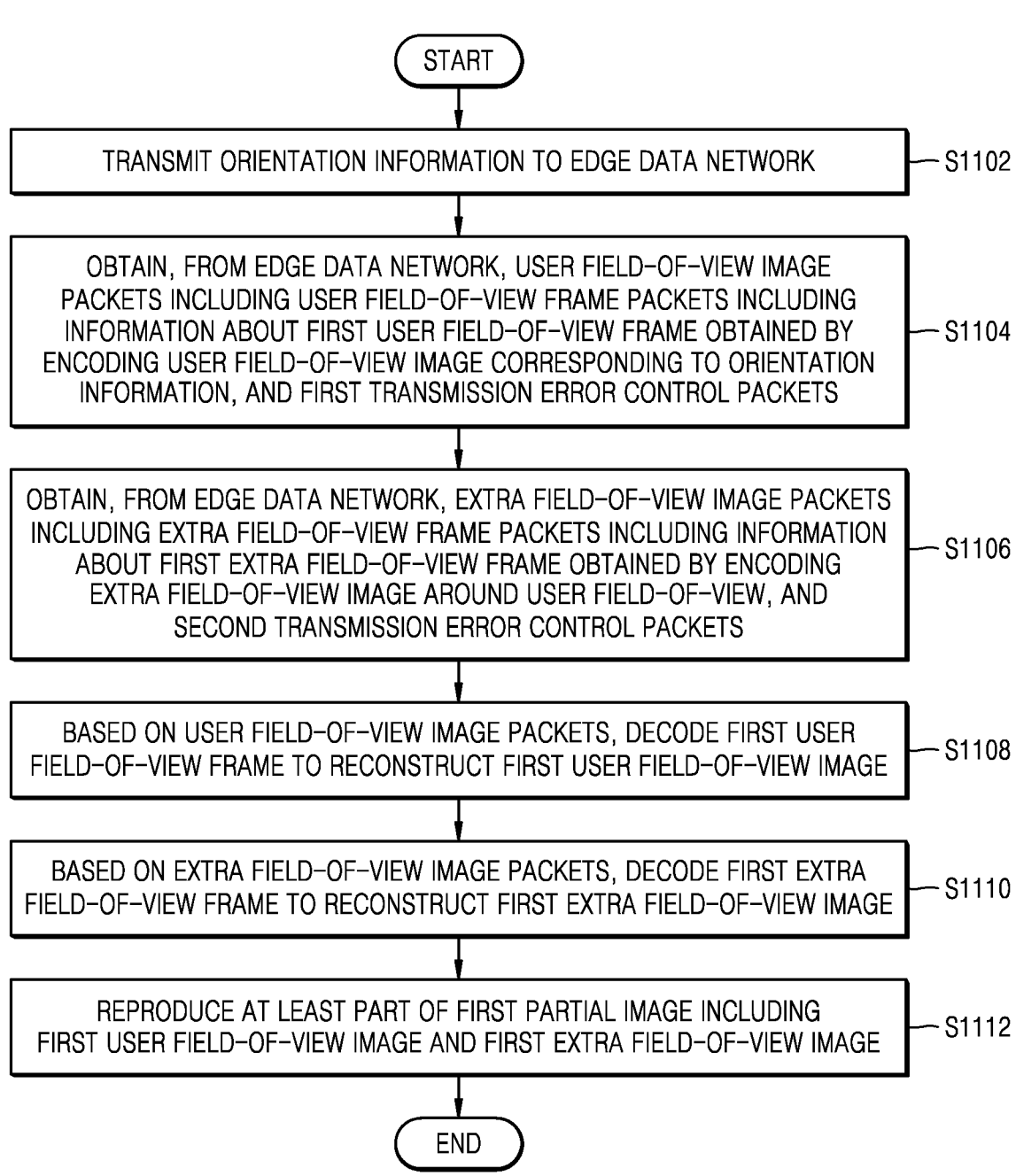

START

TRANSMIT ORIENTATION INFORMATION TO EDGE DATA NETWORK — S1102

OBTAIN, FROM EDGE DATA NETWORK, USER FIELD-OF-VIEW IMAGE PACKETS INCLUDING USER FIELD-OF-VIEW FRAME PACKETS INCLUDING INFORMATION ABOUT FIRST USER FIELD-OF-VIEW FRAME OBTAINED BY ENCODING USER FIELD-OF-VIEW IMAGE CORRESPONDING TO ORIENTATION INFORMATION, AND FIRST TRANSMISSION ERROR CONTROL PACKETS — S1104

OBTAIN, FROM EDGE DATA NETWORK, EXTRA FIELD-OF-VIEW IMAGE PACKETS INCLUDING EXTRA FIELD-OF-VIEW FRAME PACKETS INCLUDING INFORMATION ABOUT FIRST EXTRA FIELD-OF-VIEW FRAME OBTAINED BY ENCODING EXTRA FIELD-OF-VIEW IMAGE AROUND USER FIELD-OF-VIEW, AND SECOND TRANSMISSION ERROR CONTROL PACKETS — S1106

BASED ON USER FIELD-OF-VIEW IMAGE PACKETS, DECODE FIRST USER FIELD-OF-VIEW FRAME TO RECONSTRUCT FIRST USER FIELD-OF-VIEW IMAGE — S1108

BASED ON EXTRA FIELD-OF-VIEW IMAGE PACKETS, DECODE FIRST EXTRA FIELD-OF-VIEW FRAME TO RECONSTRUCT FIRST EXTRA FIELD-OF-VIEW IMAGE — S1110

REPRODUCE AT LEAST PART OF FIRST PARTIAL IMAGE INCLUDING FIRST USER FIELD-OF-VIEW IMAGE AND FIRST EXTRA FIELD-OF-VIEW IMAGE — S1112

END

FIG. 14

IMAGE CONTENT TRANSMISSION METHOD AND APPARATUS USING EDGE COMPUTING SERVICE

CROSS-REFERENCE TO RELATED APPLICATIONS

This application is a continuation of International Application No. PCT/KR2021/006100 designating the United States, filed on May 14, 2021, in the Korean Intellectual Property Receiving Office and claiming priority to Korean Patent Application No 10-2020-0125087, filed on Sep. 25, 2020, in the Korean Intellectual Property Office, and to U.S. Provisional Application No. 63/025,389, filed on May 15, 2020, in the United States Patent and Trademark Office, the disclosures of each of which are incorporated by reference herein in their entireties.

BACKGROUND

Field

The disclosure relates to an image content transmission method and apparatus using an edge computing service (e.g., a multi-access edge computing (MEC) service).

Description of Related Art

Recently, edge computing technology for transmitting data using an edge server has been discussed. Edge computing technology may include, for example, multi-access edge computing (MEC) or fog computing (FOC). Edge computing technology provides data to an electronic device via a separate server (hereinafter referred to as 'edge data network' or 'MEC server') provided at a location geographically close to the electronic device, for example, inside or around a base station. For example, an application requiring low latency among at least one application installed in an electronic device may transmit and receive data via an edge server provided at a geographically close location, without passing through a server located in an external data network (DN) (e.g., the Internet).

Recently, a service using edge computing technology (hereinafter referred to as 'MEC-based service' or 'MEC service') has been discussed, and research and development of electronic devices to support MEC-based services have been conducted. For example, an application of an electronic device may transmit and receive edge computing-based data to and from an edge server (or an application of the edge server) in an application layer.

As research and development to support MEC-based services progresses, techniques for providing high-resolution image content to an electronic device using MEC have been discussed.

SUMMARY

Based on the discussions above, the present disclosure relates to an image content transmission method and apparatus using an edge computing service.

More particularly, embodiments of the disclosure provide a method, performed by an edge data network, of transmitting image content to an electronic device, and the edge data network for providing image content to the electronic device.

In addition, embodiments of the disclosure provide a method, performed by an electronic device, of receiving image content from an edge data network, and the electronic device for receiving image content from the edge data network.

According to an example embodiment, a method, performed by an edge data network, of transmitting image content includes: obtaining orientation information from an electronic device connected to the edge data network; obtaining a first partial image including a user field-of-view image corresponding to the orientation information and an extra field-of-view image neighboring the user field-of-view image; generating a first user field-of-view frame by encoding the user field-of-view image using at least one first encoding parameter; generating a first extra field-of-view frame by encoding the extra field-of-view image using at least one second encoding parameter; transmitting, to the electronic device, user field-of-view image packets including user field-of-view frame packets including information about the first user field-of-view frame, and first transmission error control packets; and transmitting, to the electronic device, extra field-of-view image packets including extra field-of-view frame packets including information about the first extra field-of-view frame, and second transmission error control packets.

The user field-of-view image may, for example, be an image having a user field-of-view, which is identified based on information about a viewport area of a display of the electronic device, with respect to a position in a virtual reality (VR) image indicated by the orientation information, and the extra field-of-view image may, for example, be an image having extra field-of-view in up, down, left, and/or right directions of the user field-of-view image.

The first partial image may be a partial image in a first VR image having a certain frame index of a VR sequence including a plurality of frames, and the first partial image may be related to orientation information indicating a position of the partial image.

The user field-of-view image packets may be transmitted to the electronic device through a first transport channel, the extra field-of-view image packets may be transmitted to the electronic device through a second transport channel, and the first and/or second transmission error control packets may, for example, be forward error correction (FEC) packets.

The first encoding parameter and the second encoding parameter may be at least one of a bit rate, a frame rate, or a resolution, which are identified based on at least one of a required latency, an available bandwidth, the number of consecutive lost packets, a packet loss rate, or a round trip time (RTT), and transmission parameters including at least one of an FEC code rate or an FEC block size, which are related to the FEC packets, may include at least one of an FEC code rate or an FEC block size, which are identified based on at least one of a required latency, an available bandwidth, the number of consecutive lost packets, a packet loss rate, or an RTT.

The method may further include: based on the FEC packets, receiving, from the electronic device, a request for retransmission of a packet that has failed to be recovered, the request being transmitted based on at least one of a number of the packet that has failed to be recovered among the user field-of-view frame packets, a time period remaining until decoding of the user field-of-view image related to the packet that has failed to be recovered, or an RTT; and based on the request for retransmission of the packet that has failed to be recovered, retransmitting, to the electronic device, the packet that has failed to be recovered.

The transmitting of the user field-of-view image packets to the electronic device may include: based on a packet loss rate, the number of consecutive lost packets, an available bandwidth, and a required time period based on a frame rate and a required latency, identifying source packets including at least some of the user field-of-view frame packets, a size of an FEC block including the FEC packets, and an FEC code rate indicating a ratio of the source packets to the FEC block; identifying the number of FEC blocks based on the number of the user field-of-view frame packets and the number of the source packets; based on the number of FEC blocks, modifying the number of source packets included in each FEC block; and based on the modified number of source packets included in each FEC block, obtaining the FEC blocks.

The request for retransmission of the packet that has failed to be recovered may be received from the electronic device based on a result of identifying, by the electronic device, whether at least a part of an area related to the packet that has failed to be recovered is included in a latest user field-of-view area based on latest orientation information of the electronic device.

A frame rate of a user field-of-view frame and a bit rate per frame (a frame data size) of the user field-of-view frame may be identified based on the FEC code rate, $R_{fps}$, $R_{fbr}$, and an available bandwidth of the electronic device, wherein $R_{fps}$ may denote a frame rate of the extra field-of-view frame compared to the user field-of-view frame, $R_{fbr}$ may denote a bit rate per frame of the extra field-of-view frame compared to the user field-of-view frame, the frame rate of the extra field-of-view frame may be identified based on a frame rate of a user field-of-view area and $R_{fps}$, and the bit rate per frame of the user field-of-view frame may be identified based on the bit rate per frame of the extra field-of-view frame and $R_{fbr}$.

State information may be received from the electronic device when the edge data network is connected to the electronic device every first period, the state information including at least one of information about a viewport area of a display of the electronic device, information about a frame rate of an extra field-of-view frame compared to a user field-of-view frame, information about a bit rate per frame of the extra field-of-view frame compared to the user field-of-view frame, or information about a required latency, channel state information may be received from the electronic device every second period, the channel state information indicating at least one of the number of consecutive lost packets, a packet loss rate, or an available bandwidth, and periodically measured RTT information may be received from the electronic device every third period.

The first partial image may include data units of a preset field-of-view range, and the generating of the first user field-of-view frame may include: obtaining a first data unit of at least one preset field-of-view range corresponding to the user field-of-view image in the first partial image; and generating the first user field-of-view frame by encoding the first data unit of the at least one preset field-of-view range, and the generating of the first extra field-of-view frame may include: obtaining a second data unit of at least one preset field-of-view range corresponding to the extra field-of-view image in the first partial image; and generating the first extra field-of-view frame by encoding the second data unit of the at least one preset field-of-view range.

According to an example embodiment of the present disclosure, an edge data network for transmitting image content to an electronic device includes: a network interface; a memory storing one or more instructions; at least one processor configured to execute the one or more instructions to obtain orientation information from an electronic device connected to the edge data network, obtain a first partial image including a user field-of-view image corresponding to the orientation information and an extra field-of-view image neighboring the user field-of-view image, generate a first user field-of-view frame by encoding the user field-of-view image using at least one first encoding parameter, generate a first extra field-of-view frame by encoding the extra field-of-view image using at least one second encoding parameter, transmit, to the electronic device, user field-of-view image packets including user field-of-view frame packets including information about the first user field-of-view frame, and first transmission error control packets, and transmit, to the electronic device, extra field-of-view image packets including extra field-of-view frame packets including information about the first extra field-of-view frame, and second transmission error control packets.

The user field-of-view image packets may be transmitted to the electronic device through a first communication channel, the extra field-of-view image packets may be transmitted to the electronic device through a second communication channel, and the first and/or second transmission error control packets may, for example, be forward error correction (FEC) packets.

The first encoding parameter and the second encoding parameter may be at least one of a bit rate, a frame rate, or a resolution, which are identified based on at least one of a required latency, an available bandwidth, the number of consecutive lost packets, a packet loss rate, or a round trip time (RTT), and transmission parameters including at least one of an FEC code rate or an FEC block size, which are related to the FEC packets, may include at least one of an FEC code rate or an FEC block size, which are identified based on at least one of a required latency, an available bandwidth, the number of consecutive lost packets, a packet loss rate, or an RTT.

The at least one processor may be further configured to execute the one or more instructions to, based on the FEC packets, receive, from the electronic device, a request for retransmission of a packet that has failed to be recovered, the request being transmitted based on at least one of a number of a packet that has failed to be recovered among the user field-of-view frame packets, a time period remaining until decoding of the user field-of-view image including the packet that has failed to be recovered, or an RTT, and, based on the request for retransmission of the packet that has failed to be recovered, retransmit, to the electronic device, the packet that has failed to be recovered.

The at least one processor may be further configured to execute the one or more instructions to, when transmitting the user field-of-view image packets to the electronic device, based on packet loss, the number of consecutive lost packets, an available bandwidth, and a required time period based on a frame rate and a required latency, identify source packets including at least some of the user field-of-view frame packets, a size of an FEC block including the FEC packets, and an FEC code rate indicating a ratio of the source packets to the FEC block, identify the number of FEC blocks based on the number of the user field-of-view frame packets and the number of the source packets, based on the number of FEC blocks, modify the number of source packets included in each FEC block, and based on the modified number of source packets included in each FEC block, obtain the FEC blocks.

The request for retransmission of the packet that has failed to be recovered may be received from the electronic device based on a result of identifying, by the electronic device, whether at least a part of an area related to the packet that has failed to be recovered is included in a latest user field-of-view area based on latest orientation information of the electronic device.

A frame rate of a user field-of-view frame and a bit rate per frame of the user field-of-view frame may be identified based on the FEC code rate, $R_{fps}$, $R_{fbr}$, and an available bandwidth of the electronic device, wherein $R_{fps}$ may denote a frame rate of the extra field-of-view frame compared to the user field-of-view frame, $R_{fbr}$ may denote a bit rate per frame of the extra field-of-view frame compared to the user field-of-view frame, the frame rate of the extra field-of-view frame may be identified based on a frame rate of a user field-of-view area and $R_{fps}$, and the bit rate per frame of the user field-of-view frame may be identified based on the bit rate per frame of the extra field-of-view frame and $R_{fbr}$.

According to an example embodiment of the disclosure, a method, performed by an electronic device, of providing image content received from an edge data network connected to the electronic device may include: transmitting orientation information to the edge data network; obtaining, from the edge data network, user field-of-view image packets including user field-of-view frame packets including information about a first user field-of-view frame obtained by encoding a user field-of-view image corresponding to the orientation information, and first transmission error control packets; obtaining, from the edge data network, extra field-of-view image packets including extra field-of-view frame packets including information about a first extra field-of-view frame obtained by encoding an extra field-of-view image neighboring the user field-of-view image, and second transmission error control packets; reconstructing a first user field-of-view image by decoding the first user field-of-view frame, based on the obtained user field-of-view image packets; reconstructing a first extra field-of-view image by decoding the first extra field-of-view frame, based on the obtained extra field-of-view image packets; and reproducing at least a part of a first partial image including the first user field-of-view image and the first extra field-of-view image.

According to an example embodiment of the present disclosure, an electronic device for receiving image content from an edge data network includes: a network interface; a memory storing one or more instructions; at least one processor configured to execute the one or more instructions to transmit orientation information to the edge data network, obtain, from the edge data network, user field-of-view image packets including user field-of-view frame packets including information about a first user field-of-view frame obtained by encoding a user field-of-view image corresponding to the orientation information, and first transmission error control packets, obtain, from the edge data network, extra field-of-view image packets including extra field-of-view frame packets including information about a first extra field-of-view frame obtained by encoding an extra field-of-view image neighboring the user field-of-view image, and second transmission error control packets, decode the first user field-of-view frame, based on the obtained user field-of-view image packets to reconstruct a first user field-of-view image, decode the first extra field-of-view frame, based on the obtained extra field-of-view image packets to reconstruct the first extra field-of-view image, and reproduce at least a part of a first partial image including the first user field-of-view image and the first extra field-of-view image.

BRIEF DESCRIPTION OF DRAWINGS

The above and other aspects, features and advantages of certain embodiments of the present disclosure will be more apparent from the following detailed description, taken in conjunction with the accompanying drawings, in which:

FIG. 8A is a flowchart illustrating a method, performed by an example edge data network, of streaming image content, according to various embodiments;

FIG. 8B is a flowchart illustrating a method, performed by an example edge data network, of streaming image content, according to various embodiments;

FIG. 9 is a flowchart illustrating a method, performed by an example edge data network, of streaming image content, according to various embodiments;

FIG. 10 is a flowchart illustrating a method, performed by an example edge data network, of streaming image content, according to various embodiments;

FIG. 11 is a flowchart illustrating a method, performed by an example electronic device, of streaming image content obtained from an example edge data network, according to various embodiments;

FIG. 14 is a diagram illustrating a process, performed by an example edge data network 2000, of transmitting, to an example electronic device 1000, a first partial image in several data units, according to various embodiments;

DETAILED DESCRIPTION

Figure 1:
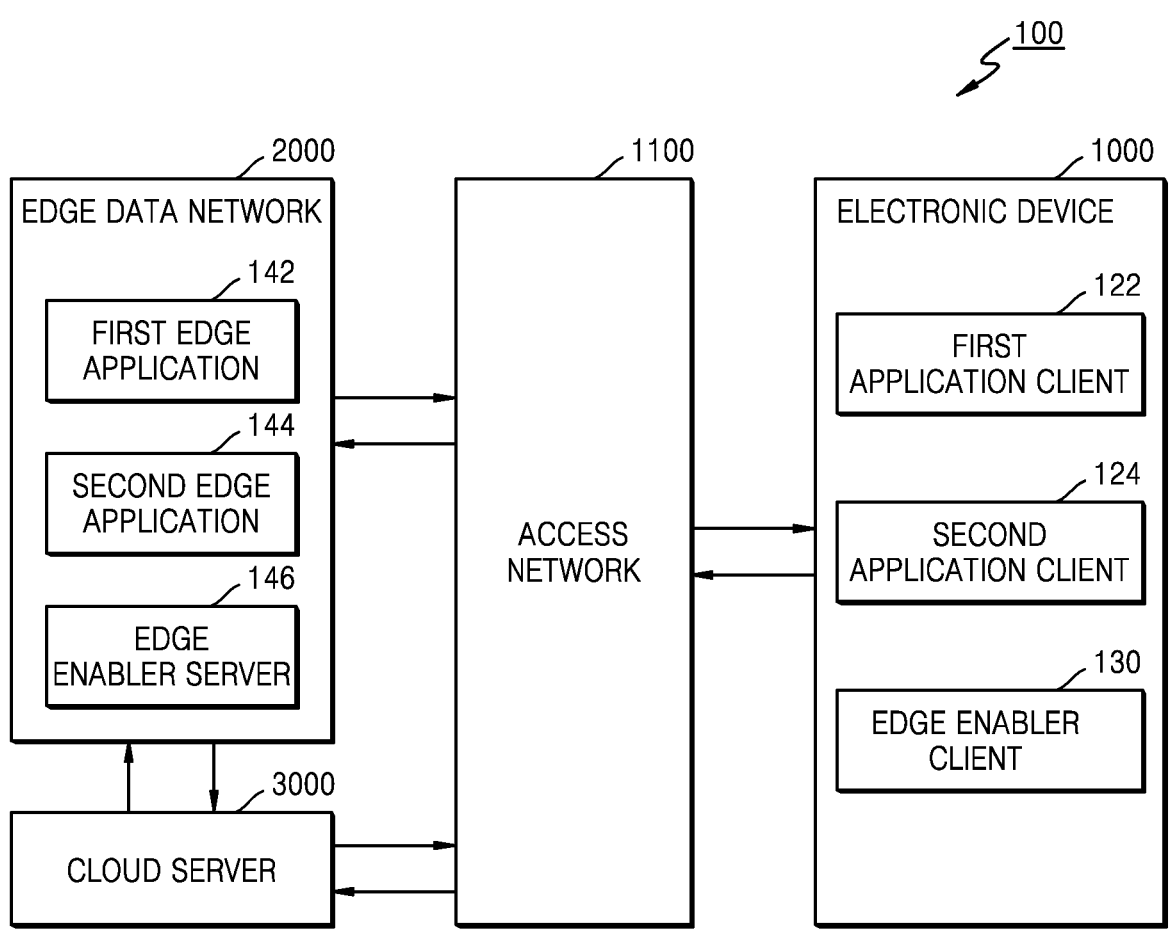
FIG. 1 is a diagram schematically illustrating multi-access edge computing (MEC) technology in a network environment, according to various embodiments.

Hereinafter, example embodiments of the disclosure are described in detail with reference to the accompanying drawings.

In the description of example embodiments, technical features that are well known to the technical field to which the present disclosure belongs, but are not directly associated with the present disclosure, are not described. This is not to obscure, but to clearly deliver the gist of the present disclosure by omitting any unnecessary description.

For the same reason, in the accompanying drawings, some elements are exaggerated, omitted, or schematically shown. In addition, sizes of elements do not fully reflect actual sizes thereof. In the drawings, identical or corresponding elements are provided with identical reference numerals.

Advantages and features of the present disclosure and methods for achieving them will be apparent with reference to embodiments described below together with the attached drawings. The present disclosure may, however, be embodied in many different forms and should not be construed as being limited to the example embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-readable memory capable of configuring a computer or other programmable data processing equipment to implement a function in a particular mode, and thus, the instructions stored in the computer-usable or computer-readable memory may also produce a production item involving an instruction means configured to perform a function described in flowchart block(s). The computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in alternative embodiments, functions described in blocks may also be out of a sequence. For example, two consecutively shown blocks may be substantially performed at the same time, or the blocks may be sometimes performed in a reverse order according to a corresponding function.

The term ' . . . unit' used in the embodiments denotes a component including software or hardware, or a combination of software and hardware, such as a field programmable gate array (FPGA) or an application-specific integrated circuit (ASIC), and the ' . . . unit' performs certain roles. However, the ' . . . unit' does not always have a meaning limited to software or hardware. The ' . . . unit' may be configured either to be stored in an addressable storage medium or to execute one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. Also, in an embodiment, the ' . . . unit' may include one or more processors.

FIG. 1 is a diagram schematically illustrating multi-access edge computing (MEC) technology in a network environment, according to various embodiments.

Referring to FIG. 1, a network environment 100 of the present disclosure may include an electronic device 1000, an edge data network 2000, a cloud server 3000, and an access network (AN) 1100. However, components included in the network environment 100 are not limited to the components illustrated in FIG. 1.

According to an embodiment, each of the components included in the network environment 100 may be a physical entity unit or a software or module unit configured to perform an individual function.

According to an embodiment, the electronic device 1000 may refer, for example, to a device used by a user. For example, the electronic device 1000 may refer to a terminal, a user equipment (UE), a mobile station, a subscriber station, a remote terminal, a wireless terminal, or a user device.

In addition, the electronic device 1000 may be a terminal for providing content to allow a user to be immersed in a virtual environment including at least one of virtual reality (VR), augmented reality (AR), or mixed reality (MR). That is, according to an embodiment, the electronic device 1000 may be a head-mounted display (HMD) or a virtual reality headset (VRH) for providing content for VR, AR, or MR.

Referring to FIG. 1, the electronic device 1000 may include a first application client (or an application client) 122, a second application client 124, and an edge enabler client (or an MEC enabling layer (MEL)) 130. The electronic device 1000 may perform, using the edge enabler client 130, a necessary operation to use an MEC service. The edge enabler client 130 is described below in detail.

According to an embodiment, the electronic device 1000 may execute a plurality of applications. For example, the electronic device 1000 may execute the first application client 122 and the second application client 124. The plurality of applications may require different network services based on at least one of a required data transmission rate, a latency (or a speed), reliability, a number of electronic devices having accessed a network, a network access period of the electronic device 1000, or an average data use amount. The different network services may include, for example, enhanced mobile broadband (eMBB), ultra-reliable and low latency communication (URLLC), or massive machine type communication (mMTC).

An application client of the electronic device 1000 may refer, for example, to a default application previously installed in the electronic device 1000 or an application provided by a third party. That is, an application client of the electronic device 1000 may refer to a client application program to run in the electronic device 1000 for a particular application service. Several application clients may run in the electronic device 1000. At least one of the application clients may use a service provided by the edge data network 2000. For example, an application client may be an application installed in and executed by the electronic device 1000, and may provide a function of transmitting and receiving data via the edge data network 2000. An application client in the electronic device 1000 may refer, for example, to application software executed in the electronic device 1000 to use a function provided by one or more particular edge applications.

According to an embodiment, the plurality of applications, i.e., the first and second application clients 122 and 124, in the electronic device 1000 may perform data transmission and reception with the cloud server 3000 based on a required network service type or perform data transmission and reception with the edge data network 2000 based on edge computing. For example, in a case in which the first application client 122 does not require a low latency, the first application client 122 may perform data transmission and reception with the cloud server 3000. As another example, in a case in which the second application client 124 requires a low latency, the second application client 124 may perform MEC-based data transmission and reception with the edge data network 2000.

According to an embodiment, an application in the electronic device 1000 may be referred to as an application client, a client application (or a client app), or a UE application (or a UE app). For convenience, hereinafter, in the present disclosure, an application in the electronic device 1000 is referred to as an application client.

According to an embodiment, the AN 1100 may provide a channel for wireless communication with the electronic device 1000. For example, the AN 1100 may refer to a radio access network (RAN), a base station, an evolved node B (eNodeB or eNB), a 5<sup>th</sup> generation (5G) node, a transmission/reception point (TRP), or a 5G NodeB (5GNB).

According to an embodiment, the edge data network 2000 may refer to a server that the electronic device 1000 accesses to use an MEC service. The edge data network 2000 may be provided at a location geographically close to the electronic device 1000, e.g., inside or around a base station. According to an embodiment, the edge data network 2000 may transmit and receive data to and from the electronic device 1000 without passing through an external data network (DN) (e.g., the Internet). In an embodiment, MEC may be referred to as multi-access edge computing or mobile-edge computing.

According to an embodiment, the edge data network 2000 may be referred to as an MEC host, an edge computing server, a mobile edge host, an edge computing platform, an MEC server, or the like. For convenience, hereinafter, in the present disclosure, the edge data network 2000 is referred to as an MEC server. Referring to FIG. 1, the edge data network 2000 may include a first edge application 142, a second edge application 144, and an edge enabler server (or an MEC platform (MEP)) 146. The edge enabler server 146 provides an MEC service or performs traffic control or the like in the edge data network 2000, and the edge enabler server 146 is described below in detail.

According to an embodiment, the edge data network 2000 may execute a plurality of applications. For example, the edge data network 2000 may execute the first edge application 142 and the second edge application 144. According to an embodiment, the edge application may refer, for example, to an application provided by a third party in the edge data network that provides the MEC service, or may be referred to as an edge application. The edge application may be used to establish a data session with the application client to transmit and receive data related to the application client. That is, the edge application may establish a data session with the application client. In an embodiment, a data session may refer to a communication path established for an application client in the electronic device 1000 and an edge application in the edge data network 2000 to transmit and receive data to and from each other.

According to an embodiment, an application in the edge data network 2000 may be referred to as an MEC application (or an MEC app), an ME (MEC) app, an edge application server, and an edge application. For convenience, hereinafter, in the present disclosure, an application in the edge data network 2000 is referred to as an edge application. Herein, although the term 'application' is used, the edge application may refer to an application server existing in the edge data network 2000.

According to an embodiment, the cloud server 3000 may provide content associated with an application. For example, the cloud server 3000 may be managed by a content provider. According to an embodiment, the cloud server 3000 may transmit and receive data to and from the electronic device 1000 via an external DN (e.g., the Internet).

Although not shown in FIG. 1, a core network (CN) and a DN may exist between the AN 1100 and the edge data network 2000. According to an embodiment, the DN may provide a service (e.g., an Internet service or an internet protocol multimedia subsystem (IMS) service) to the electronic device 1000 by transmitting and receiving data (or data packets) to and from the electronic device 1000 via the CN and the AN 1100. For example, the DN may be managed by a communication provider. In an embodiment, the edge data network 2000 may be connected to the AN 1100 or the CN via the DN (e.g., a local DN).

According to an embodiment of the present disclosure, in a case in which the first application client 122 or the second application client 124 is executed by the electronic device 1000, the electronic device 1000 may access the edge data network 2000 via the AN 1100 to transmit and receive data for executing an application client.

In an embodiment of the present disclosure, a method of streaming image content among the above-described electronic device 1000, edge data network 2000, and cloud server 3000 may be provided. In more detail, a method of effectively providing content for VR, AR, or MR to a user, based on the user's interaction information on an image reproduced by the electronic device 1000 is described. Hereinafter, a method, performed by the edge data network 2000, of streaming image content, based on orientation information of image content reproduced by the electronic device 1000 is described.

Figure 2:
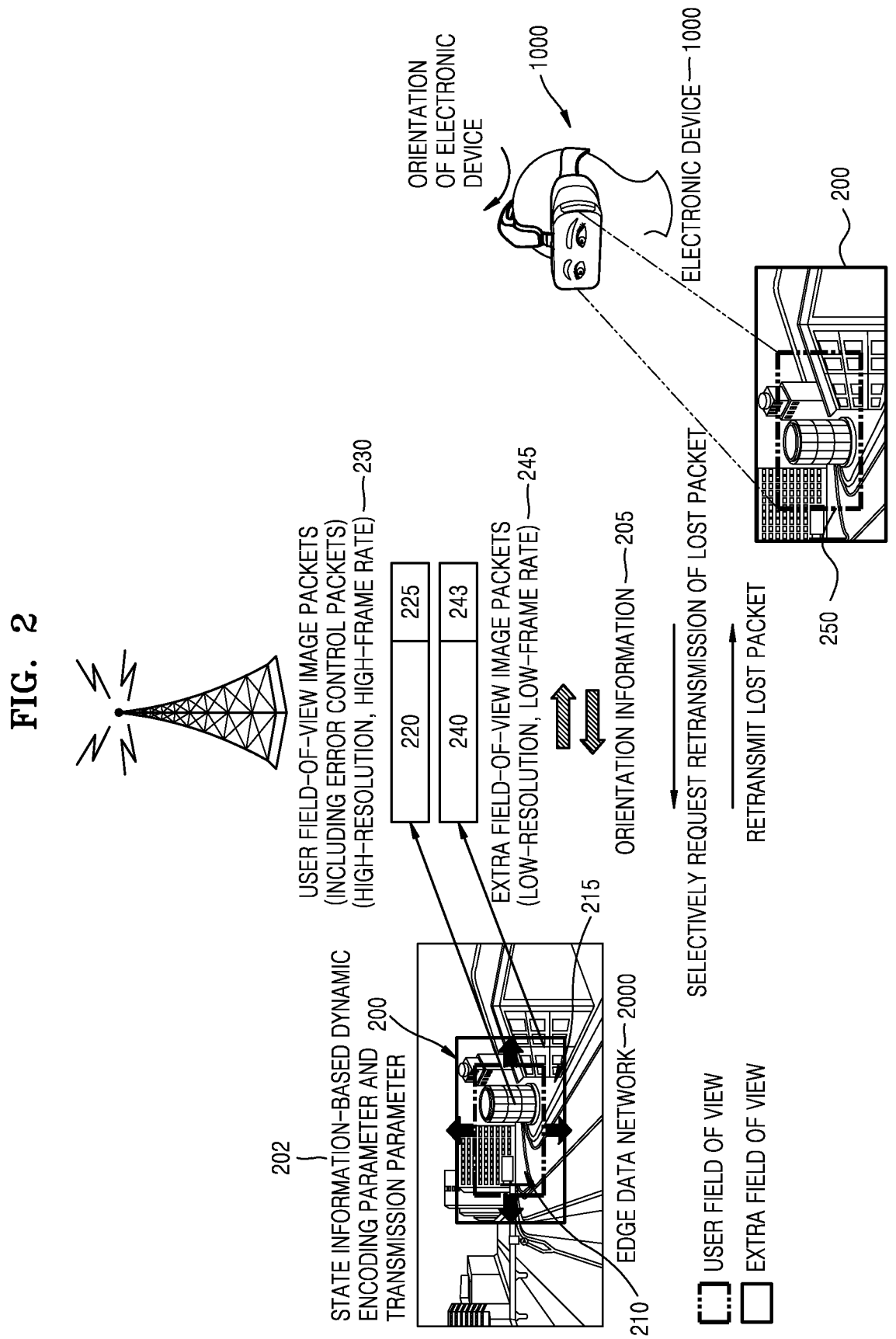
FIG. 2 is a diagram for describing an example method, performed by an edge data network 2000, of adaptively streaming packets for a user field-of-view (FoV) image and packets for an extra FoV image in an extended FoV image, based on orientation information, a dynamic encoding parameter, and a transmission parameter, according to various embodiments.

FIG. 2 is a diagram for describing a method, performed by the example edge data network 2000, of adaptively streaming packets for a user field-of-view (FoV) image and packets for an extra FoV image in an extended FoV image, based on orientation information, a dynamic encoding parameter, and a transmission parameter, according to various embodiments.

Referring to FIG. 2, the electronic device 1000 may sense orientation information 205, and transmit, to the edge data network 2000, the orientation information, periodically, upon a request from the edge data network 2000, or upon a change in a value included in the orientation information.

In this case, the orientation information may include angle values of a gaze of the user of the electronic device 1000, which are measured using a sensing module of the electronic device 1000. For example, the electronic device 1000 may sense, using the sensing module (e.g., a three-axis tilt sensor), orientation information (e.g., roll, pitch, and yaw values, although the orientation information is not limited thereto and may, for example, include values of four elements of a quaternion) of a gaze of the user looking at a certain partial image of a VR image, and the electronic device 1000 may transmit the sensed orientation information to the edge data network 2000, so as to share, with the edge data network 2000, information about at which portion of the VR image the user of the electronic device 1000 is currently looking.

The edge data network 2000 may obtain a first partial image 200 including a user FoV image 210 corresponding to the orientation information 205 received from the electronic device 1000, and an extra FoV image 215 including extra FoV portions surrounding the user FoV image 210.

Here, the term 'FoV' refers, for example, to the extent to which the user's eyes may view a scene (e.g., a FoV may be expressed as an angle, but is not limited thereto). In a case of viewing an image with a larger FoV, a larger area of the image may be viewed by the user's eyes.

However, the extent to which the user may view an image through a display of the electronic device 1000 may be limited to the size of a viewport area of the electronic device 1000. The size of the viewport area is the size of an FoV with which an image may be reproduced on the display of the electronic device 1000 (i.e., the size of a display area), and the size of the viewport area may be identified according to capability information of the electronic device 1000. That is, the size of the viewport area is one example of hardware specifications of the display of the electronic device 1000, and the edge data network 2000 may receive, from the electronic device 1000 via a network connection therewith, the capability information of the electronic device 1000, and identify the size of the viewport area of the electronic device 1000 according to the capability information.

For example, in a case in which the size of the viewport area of the electronic device 1000 in the horizontal direction is 110° and the size of the viewport area of the electronic device 1000 in the vertical direction is 90°, the electronic device 1000 may transmit, to the edge data network 2000 via a network connection, the capability information of the electronic device 1000 including information about the size of the viewport area, and the edge data network 2000 may identify, based on the capability information, that the size of the viewport area in the horizontal direction is 110° and the size of the viewport area in the vertical direction is 90°.

Accordingly, the term 'user FoV' (or 'default FoV') may refer to an area viewable by the user through the viewport area of the electronic device 1000. In a case in which the orientation of the electronic device 1000 is changed according to the movement of the user's head over time, and thus the area of an image viewable by the user is changed, the user is unable to view the entire area of an image being viewed with the existing user FoV, and thus, the term 'extra FoV' may refer to an FoV that is obtained considering such a situation (e.g., upper, lower, left, and right extra FoVs around the user FoV).

The FoV of the first partial image encoded to be displayed on the electronic device 1000 may be an extended FoV including a user FoV (a default FoV) and an extra FoV. That is, the first partial image may be an extended FoV image including a user FoV image (a default FoV image) and an extra FoV image.

The edge data network 2000 may encode the user FoV image 210 to generate a first user FoV frame. Also, the edge data network 2000 may encode the extra FoV image 215 to generate a first extra FoV frame. For example, in order for the extra FoV image 215 to be encoded to have a quadrangular shape considering the shape of the extra FoV image 215 (e.g., a quadrangular donut shape), the first extra FoV frame may be generated by replacing the user FoV image 210 with particular color (e.g., black), and encoding an image including an extra FoV image 215 and the user FoV image 210 replaced with the particular color. That is, by expressing an entire particular continuous area with one color value, a result of encoding occupies insignificant capacity, and the extra FoV image 215 may be encoded as described above considering that an existing encoding module receives and encodes a quadrangular image. However, the present disclosure is not limited in this respect, and those of skill in the art may understand that information of the extra FoV image 215 may be encoded according to various methods. For example, the edge data network 2000 may generate the first extra FoV frame by replacing the user FoV image 210 with a particular pattern, and encoding an image including the extra FoV image 215 and the user FoV image 210 that is replaced with the particular pattern. Alternatively, the edge data network 2000 may rearrange samples of the extra FoV image 215 according to a certain scan order to change the shape of the extra FoV image 215 to a quadrangular shape, and then encode the resulting image having the quadrangular shape. In this case, each of the FoV images 210 and 215 may be encoded using a state information-based dynamic encoding parameter 202. Here, the state information may include orientation information and network state information. In addition, the state information may include information about a required latency given in a VR application.

The network state information may be information about a network state obtained by continuously monitoring packets received by the electronic device 1000 or by performing round-trip time (RTT) measurement. For example, the network state information obtained based on packets received by the electronic device 1000 may be information about packet loss rates, available bandwidths, throughputs, and the number of consecutive lost packets, etc., which are obtained by performing periodic monitoring. In addition, the network state information obtained based on an RTT measurement request message transmitted from the electronic device 1000 may be information about an RTT (the RTT is related to the current latency) measured by the electronic device 1000. That is, the electronic device 1000 may, for example, start a timer at a time point of transmission of the RTT measurement request message to the edge data network 2000, and measure, based on the timer, an RTT, which is a time period between the time point of the transmission of the RTT measurement request message and a time point at which a response to the RTT measurement request message is received. The RTT measurement request message may include a certain number of packets.

Meanwhile, the state information-based dynamic encoding parameter may, for example, include an image quality-related parameter and a frame rate (e.g., the number of frames per second). The image quality-related parameter may include the resolution, bit rate per second, bit rate per frame, etc. Here, the number of frames per second refers to the number of frames reproduced per second, and as the value increases, an image being reproduced may appear natural, whereas, as the value decreases, an image being reproduced may appear unnatural and laggy. The bit rate of an image is one of the parameters indicating the quality of the image, and may indicate, for example, a target number of bits (or bytes or packets) per second in encoding the image. For the same resolution (or size), a result of encoding an image with a higher bit rate may have higher quality than that of a result of encoding the image with a lower bit rate. A bit rate may be used as a parameter input to an encoding module to adjust the image quality of an image. However, the present disclosure is not limited thereto, and a bit rate per frame (also referred to as a frame data size) may be further used as a parameter indicating the quality of an image. The data size for each frame refers to the amount of transmitted frame data (data obtained by encoding frames), and may be expressed in bits or bytes. In general, as the image quality/resolution increases, the bit rate may increase. That is, the data size for each frame (and the frame rate) may be determined based on the available bandwidth, the resolution may be adjusted with respect to the determined data size for each frame or the image quality (parameters related to the image quality, e.g., bit rate per second) may be adjusted using various related-art video rate adaptation techniques, and thus, the resolution and bit rate may be identified.

The resolution of an image refers to the number of pixels of a frame to be encoded, and, for the same pixel size, as the resolution increases, the size and quality of the image may increase. The resolution of an image may be related to the size of the image.

In detail, the edge data network 2000 may identify the state information-based dynamic encoding parameter 202 as described below. For example, the edge data network 2000 may identify an appropriate encoding parameter in order to, considering the bandwidth available to the electronic device 1000, appropriately allocate resources of the bandwidth to a user FoV image and an extra FoV image according to the ratio of the frame data size or frame rate of each FoV image. Details of identifying an encoding parameter based on state information are described below with reference to FIG. 5.

In this case, the edge data network 2000 may encode the user FoV image 210 by using a relatively high-image quality parameter (e.g., a high bit rate) and a high frame rate to generate a user FoV frame, and generate user FoV frame packets 220 including information about the user FoV frame.

The edge data network 2000 may encode the extra FoV image 215 using a relatively low-image quality parameter (e.g., a low bit rate) and a low frame rate to generate an extra FoV frame, and generate extra FoV image packets 245 including information about the extra FoV frame.

Meanwhile, with respect to the user FoV image 210, the edge data network 2000 may generate, in addition to the user FoV frame packets 220, transmission error control packets 225 corresponding to the user FoV frame packets 220, for controlling a transmit error. Examples of the transmission error control packets may include a forward error correction (FEC) packet. An FEC packet is a packet having an error correction function, and the electronic device 1000 may correct an error with respect to a lost packet in the received user FoV frame packets 220, based on the FEC packet. Upon an error with respect to a lost packet being uncorrectable based on the FEC packet, the electronic device 1000 may request retransmission of the lost packet. In this case, the edge data network 2000 may generate the error control packets 225 based on the state information-based transmission parameter 202. Here, the transmission parameter is a parameter related to generation of a transmit error packet, and, in a case in which the error control packet is an FEC packet, the transmission parameter may be an FEC block size and an FEC code rate. The FEC block size may refer to the sum of the number of source packets and the number of FEC packets within one FEC block. The FEC code rate is a value obtained by dividing the number of FEC packets by the FEC block size, and may indicate the ratio of meaningful data (encoded image data and frames) to entire data. The source packet refers to a packet to be subjected to FEC packet-based error correction, and the user FoV frame packets 220 may be an example thereof. However, some of the user FoV frame packets 220 may be source packets within one FEC block, considering the FEC block size.

The edge data network 2000 may generate the transmission error control packets 225 (e.g., an FEC packet) for the user FoV frame packets 220 based on the FEC block size and the FEC code rate, which are state information-based dynamic transmission parameters. The edge data network 2000 may transmit, to the electronic device 1000, user FoV image packets 230 including the user FoV frame packets 220 and the transmission error control packets 225.

Meanwhile, the edge data network 2000 may transmit the extra FoV image packets 245 to the electronic device 1000.

For example, with respect to the extra FoV image 215, the edge data network 2000 may generate, in addition to extra FoV frame packets 240, transmission error control packets 243 corresponding to the extra FoV frame packets 240, for controlling a transmit error. In this case, in a case in which the transmission error control packet included in the extra FoV image packets 245 is FEC packets, the FEC code rate may be 0, but is not limited thereto. That is, in a case in which the FEC code rate is 0, an FEC packet, which is a transmission error control packet, is not included.

Here, a transport protocol related to encapsulation of each packet may be User Datagram Protocol (UDP), but is not limited thereto. Compared to Transmission Control Protocol (TCP) for use as the transport protocol, UDP has low reliability but a high transmission rate, and thus, may be used for streaming services in which continuity or timeliness is more important than reliability.

The edge data network 2000 may transmit the user FoV image packets 230 and the extra FoV image packets 245, to the electronic device 1000 through different transport channels. The term 'transport channel' may refer to a channel through which data is transmitted and received between the edge data network 2000 and the electronic device 1000 in a transport layer (i.e., a path through which signals or information is transmitted). That is, a transport channel may be a path through which data (e.g., packets) are exchanged between a transmitting side (e.g., an edge data network) and a receiving side (e.g., an electronic device) in an end-to-end manner.

Based on a port number of a transport protocol (i.e., a port number of a destination) included in (the header of) the user FoV image packets 230, the electronic device 1000 may transmit the user FoV frame packets 220 to an application process of an application layer related to processing of the user FoV frame packets 220 (i.e., decoding of a user FoV frame). Also, based on a port number of a transport protocol included in (the header of) the extra FoV image packets 245, the electronic device 1000 may transmit the extra FoV image packets 245 to an application process related to processing the extra FoV image packets 245 (i.e., decoding an extra FoV image). That is, the port numbers of the respective packets may be different from each other, and it is possible to identify, based on the port numbers, to which application processes the packets are to be transmitted.

The electronic device 1000 may reconstruct the user FoV image by decoding the user FoV frame based on the user FoV frame packets 220. Also, the electronic device 1000 may reconstruct the extra FoV image by decoding the extra FoV frame based on the extra FoV frame packets 240.

Meanwhile, in a case in which the electronic device 1000 did not receive some of the user FoV frame packets 220 (i.e., a lost packet has occurred), based on the error control packets 225, the electronic device 1000 may recover the lost packet. In a case in which the recovery of the lost packet is successful, the electronic device 1000 may not request retransmission of the lost packet.

In a case in which the recovery of the lost packet has failed, the electronic device 1000 may selectively transmit, to the edge data network 2000, a request for retransmission of the lost packet that has failed to be recovered.

In this case, the retransmission request may include a number indicating the lost packet (i.e., a sequence number). That is, only in a case of predicting that the lost packet may be received before the completion of decoding of the user FoV frame, by considering an RTT and a time period remaining until the completion of the decoding of the user FoV frame, the electronic device 1000 may transmit, to the edge data network 2000, the request for retransmission of the lost packet. Only in a case in which the request for retransmission of the lost packet is received from the electronic device 1000, the edge data network 2000 may retransmit the lost packet in response to the request.

The electronic device 1000 may obtain a partial image including the reconstructed user FoV image and extra FoV image, obtain, based on the latest orientation information obtained from the sensing module, a user FoV image 250 from the partial image, and display the user FoV image 250 on the display of the electronic device 1000.

The electronic device 1000 may receive user FoV image packets and extra FoV image packets related to a next image to be reproduced, by transmitting updated orientation information to the edge data network 2000. Until the next image to be reproduced is received based on the transmitted orientation information, the electronic device 1000 may obtain a user FoV image of the current time point, from a previously reconstructed partial image, based on the orientation information periodically obtained from the sensing module.

Accordingly, even in a case in which a motion-to-photon latency (MTP latency) to a time point at which next image to be reproduced is received increases, the edge data network 2000 may prevent the user from seeing a black edge by performing local processing based on the extra FoV image, so as to achieve a sufficient offset for the period of time required for receiving the next image to be reproduced, thereby substantially compensating for the MTP latency. Here, the MTP latency may refer to a period of time during which the edge data network 2000 identifies a movement of the user (e.g., a movement of the gaze of the user) based on sensor information (e.g., orientation information) obtained through the sensing module of the electronic device 1000 and transmitted to the edge data network 2000, the edge data network 2000 provides a frame of a partial image in the VR image based on the sensor information, and the electronic device 1000 performs decoding and rendering on the provided frame of the partial image and then displays the rendered frame on the display.

As described above, the edge data network 2000 may perform parallel and independent processing on a user FoV image and an extra FoV image, by encoding each of the user FoV image and the extra FoV image using encoding parameters for each of the user FoV image and the extra FoV image. That is, by encoding, with high quality and high frames per second (FPS), the user FoV image corresponding to an area at which a user is directly looking at a time point of requesting an image, and transmitting a result of the encoding, and encoding, with low quality and low FPS, the extra FoV image corresponding to the other areas and transmitting a result of the encoding, it is possible to efficiently utilize network resources and enable parallel and independent image processing. That is, by transmitting, with low quality and a low frame rate, the extra FoV image having a low utilization rate, and transmitting, with high quality and a high frame rate, the user FoV image having a high utilization rate, network resources may be efficiently utilized.

That is, when the user wearing the electronic device 1000 moves his/her head, the orientation information may be updated, and a user FoV image based on orientation information updated in real time may be displayed on the display. In this case, because the user's focus usually moves smoothly, it is common for the focus not to deviate from the range of the user FoV image corresponding to the orientation information transmitted in response to an image request, and because the next image is subsequently requested and received based on updated orientation information, the extra FoV image does not need to be encoded with high image quality and a high frame rate, but may be encoded with low image quality and a low frame rate.

The edge data network 2000 may identify, based on a state, a dynamic encoding parameter and a transmission parameter. That is, in order to appropriately allocate resources for the user FoV image and the extra FoV image according to an available bandwidth and a required latency given by a VR application, the edge data network 2000 may identify a transmission parameter, such as an FEC code rate or an FEC block size, and an encoding parameter related to image quality of each area (e.g., a frame data size), and an encoding parameter, such as a frame rate.

As described above, the edge data network 2000 may request, by selectively transmitting a retransmission request for a lost packet, retransmission of the lost packet only in a case of expecting that the lost packet that is retransmitted will be successfully received before completion of image decoding, considering that there is a short RTT between the edge data network 2000 and the electronic device 1000. In addition, the edge data network 2000 may quickly attempt to recover the lost packet by transmitting an FEC packet together in readiness for loss of the user FoV frame packets, which has a great influence on the quality of experience (QoE), and may improve the QoE by requesting retransmission of the lost packet only in a case in which the lost packet is unrecoverable.

Figure 3:
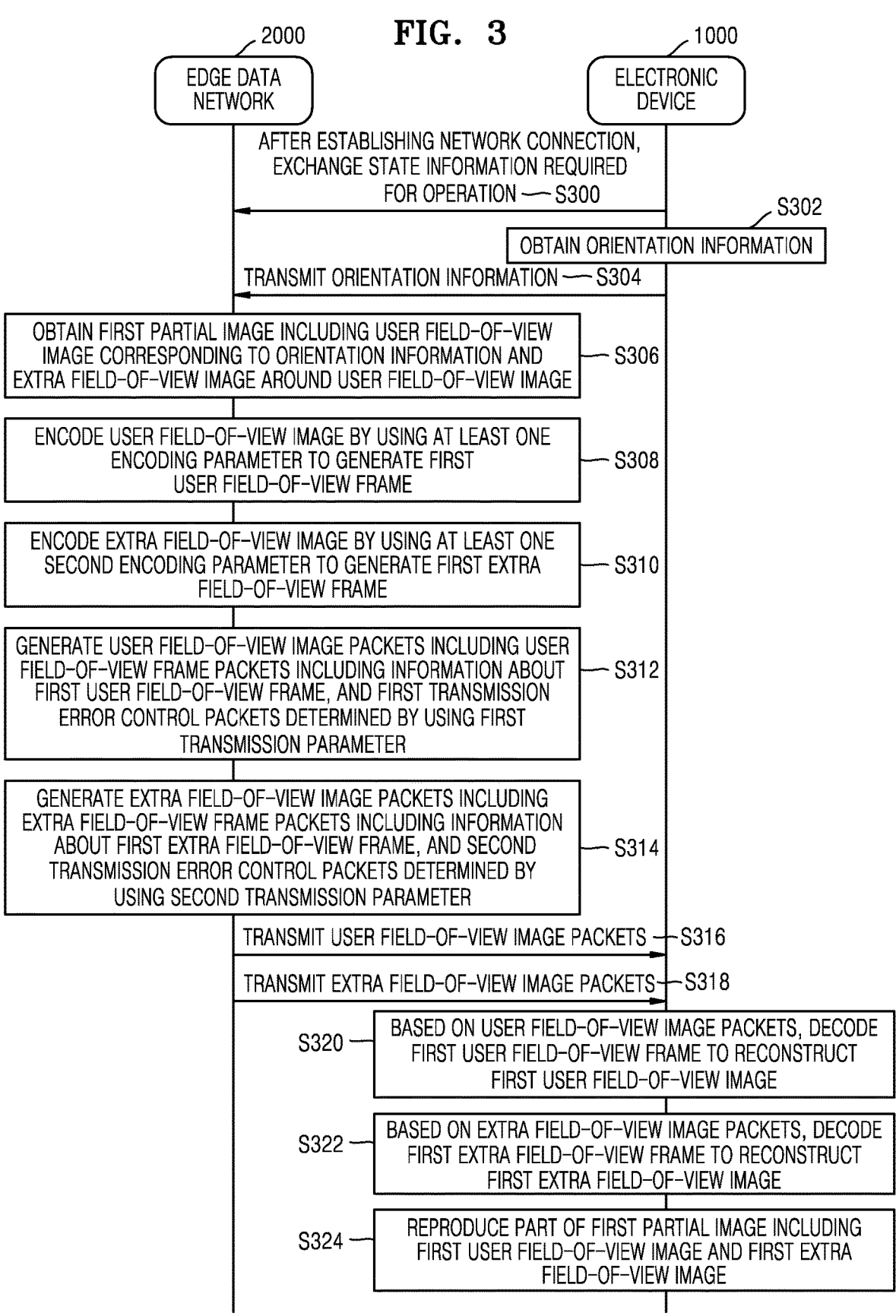
FIG. 3 is a flowchart illustrating an operation procedure between an example electronic device and an example edge data network, according to various embodiments.

FIG. 3 is a flowchart illustrating an operation procedure between an example electronic device and an example edge data network, according to various embodiments.

Referring to FIG. 3, in operation S300, the edge data network 2000 may establish a network connection with the electronic device 1000, and may share, with the electronic device 1000, state information required for operations of the edge data network 2000 and the electronic device 1000. In this case, the state information may be shared only initially, periodically, or aperiodically only upon reception of a request or upon the occurrence of a change in the state information.

For example, the edge data network 2000 may receive, from the electronic device 1000, capability information of the electronic device 1000. For example, the capability information may be information indicating operation-related capability of the electronic device 1000, for example, information about the size of the viewport area of the electronic device 1000.

Also, the capability information may include information about a required latency of a VR application, the initial ratio ($R_{size}$ or $R_{fps}$) of a frame data size or a frame rate of an extra FoV image to that of a user FoV image, and an initial frame rate and an initial frame data size of the user FoV image. For example, the required latency may be 20 ms, $R_{size}$ or $R_{fps}$ may be 0.5, the initial frame rate may be 60 fps, and the initial frame data size may be several to tens of megabits per frame in a full high-definition (FHD) resolution.

In operation S302, the electronic device 1000 may obtain orientation information. The orientation information may be information indicating an angle component.

In operation S304, the electronic device 1000 may transmit the orientation information to the edge data network 2000. The electronic device 1000 may periodically transmit sensor information to the edge data network 2000, but is not limited thereto, and may aperiodically transmit the sensor information to the edge data network 2000. For example, the electronic device 1000 may transmit the sensor information only upon a request from the edge data network 2000 or a change in a value of the sensor information.

In operation S306, the edge data network 2000 may obtain a first partial image including a user FoV image corresponding to the orientation information and an extra FoV image neighboring the user FoV image. The user FoV image may be an image having a user FoV identified based on information about the viewport area of the display of the electronic device 1000, based on a position in a VR image indicated by the orientation information. The first partial image may be a partial image in a first VR image having a certain frame index of a VR sequence including a plurality of frames, and the first partial image may be related to the orientation information indicating a position of the partial image.

In operation S308, the edge data network 2000 may encode the user FoV image using at least one first encoding parameter to generate a first user FoV frame. In this case, the first encoding parameter and a second encoding parameter to be described below may be encoding parameters identified based on the state information. The encoding parameters identified based on the state information are described below with reference to FIG. 5. The first encoding parameter may include an encoding parameter (e.g., a high frame data size and a high bit rate per frame or a high bit rate or frame rate per second), which indicate higher quality than those of the second encoding parameter used for the extra FoV frame.

In operation S310, the edge data network 2000 may encode the extra FoV image using at least one second encoding parameter to generate a first extra FoV frame.

In operation S312, the edge data network 2000 may generate user FoV image packets including user FoV frame packets including information about the first user FoV frame, and first transmission error control packets determined using a first transmission parameter. In this case, the edge data network 2000 may generate the transmission error control packets based on the first transmission parameter identified based on the state information. For example, in a case in which the error control packet is an FEC packet, the transmission parameter may be an FEC block size and an FEC code rate. The transmission parameter identified based on the state information is described below with reference to FIG. 6.

In operation S314, the edge data network 2000 may generate extra FoV image packets including extra FoV frame packets including information about the first extra FoV frame, and second transmission error control packets determined using a second transmission parameter. In this case, the edge data network 2000 may generate the transmission error control packets based on the second transmission parameter identified based on the state information. In this case, in a case in which the second transmission error control packets included in the extra FoV image packets is FEC packets, the FEC code rate may be 0, but is not limited thereto.

In operation S316, the edge data network 2000 may transmit the user FoV image packets to the electronic device 1000.

In operation S318, the edge data network 2000 may transmit the extra FoV image packets to the electronic device 1000. In this case, the extra FoV image packets and the user FoV image packets may be transmitted through different transport channels.

In operation S320, based on the user FoV image packets, the electronic device 1000 may decode the first user FoV frame to reconstruct a first user FoV image. In this case, in a case in which some of the user FoV frame packets of the user FoV image packets are lost, the electronic device 1000 may attempt to recover the lost packet based on the transmission error control packets having an error correction function among the user FoV image packets, and, in a case in which the lost packet is successfully recovered, the electronic device 1000 may decode the first user FoV frame further based on the recovered packet to reconstruct the first user FoV image. In a case in which the recovery of the lost packet has failed, the electronic device 1000 may selectively request retransmission of the packet that has failed to be recovered. Selective retransmission of a packet that has failed to be recovered is described below with reference to FIGS. 7 and 12A, 12B, and 12C.

In operation S322, the electronic device 1000 may decode the first extra FoV frame based on the extra FoV image packets, to reconstruct a first extra FoV image. In this case, because the extra FoV image packets may not include any transmission error control packet and an error is unable to be corrected, it is possible to selectively request retransmission of a lost packet without attempting to recover the lost packet, but the present disclosure is not limited thereto, and retransmission of a lost packet may not always be requested in consideration of the low importance of the extra FoV image packets. An operation, performed by the electronic device 1000, of selectively requesting retransmitting a lost packet among the extra FoV image packets is substantially the same as the above-described operation of selectively requesting retransmitting a packet that has failed to be recovered, among the user FoV frame packets, and thus, detailed descriptions thereof are omitted.

In operation S324, the electronic device 1000 may reproduce a part of the first partial image including the first user FoV image and the first extra FoV image. For example, the electronic device 1000 may obtain latest orientation information at a time point of the reproduction, and reproduce the part of the first partial image corresponding to the latest orientation information.

Figure 4:
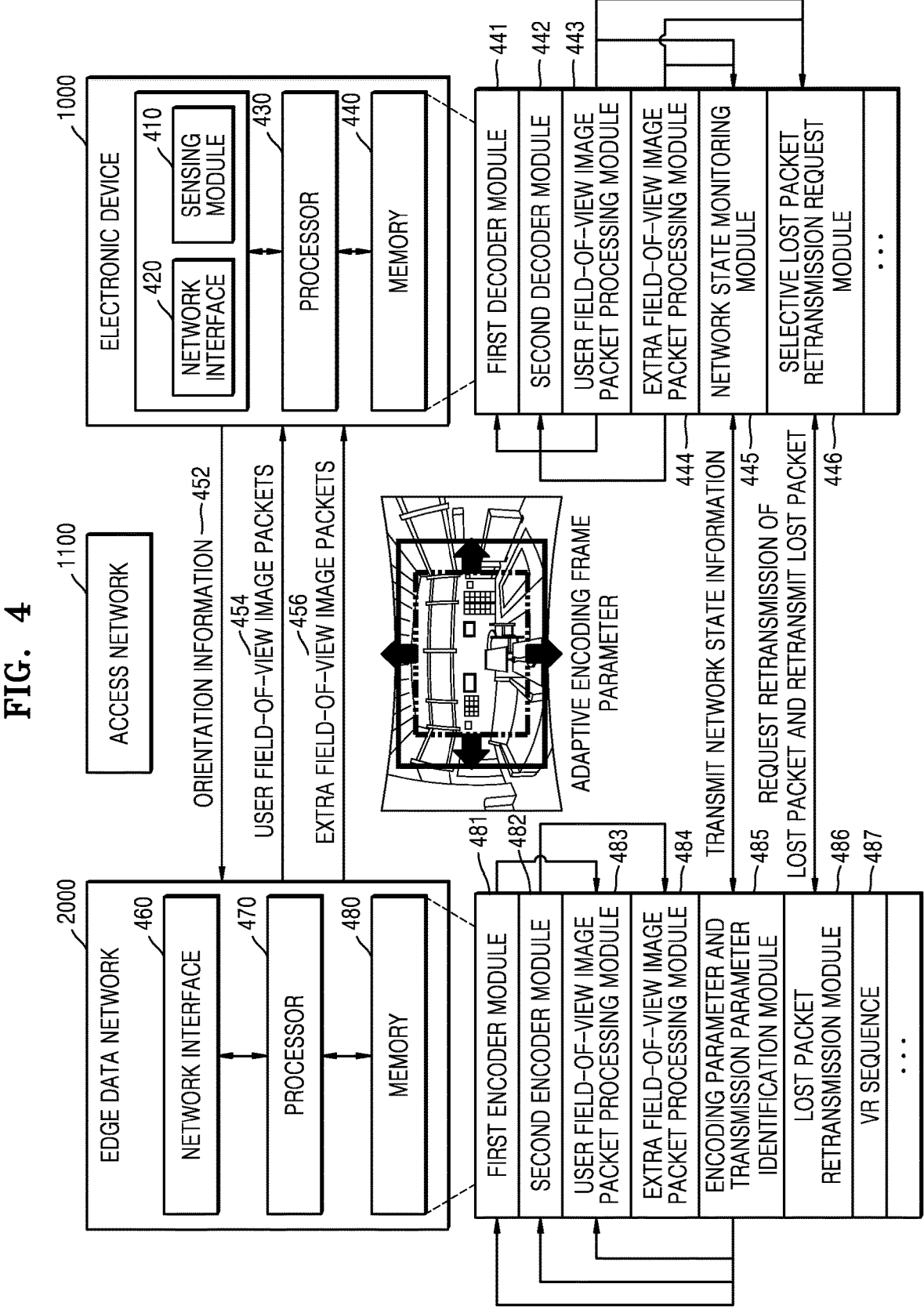
FIG. 4 is a diagram schematically illustrating an operation procedure between an example electronic device and an example edge data network according to various embodiments.

FIG. 4 is a diagram schematically illustrating an operation procedure between an example electronic device and an example edge data network according to various embodiments.

According to an embodiment, the electronic device 1000 may include a sensing module 410, a network interface 420, a processor 430, and a memory 440. However, components in the electronic device 1000 are not limited thereto, and the electronic device 1000 may include more or fewer components.

The electronic device 1000 may decode images received from the edge data network 2000 or the cloud server 3000, and display images obtained as a result of the decoding, on the display of the electronic device. Also, the electronic device 1000 may obtain orientation information using the sensing module 410.

The electronic device 1000 transmits the orientation information to the edge data network 2000 by using the network interface 420. In this case, the electronic device 1000 may transmit, to the edge data network 2000, frame index information obtained when the orientation information is sensed. However, the present disclosure is not limited thereto, and reference frame information among reconstructed frames may be transmitted to the edge data network 2000 before the orientation information is sensed. Here, the frame index may be information indicating an encoding/decoding order of a frame, but is not limited thereto, and the frame index may be information indicating a rendering order of the frame.

The processor 430 controls the overall operation of the electronic device 1000 by executing one or more instructions in the memory 440. For example, the processor 430 may control the sensing module 410 and the network interface 420 by executing the one or more instructions stored in the memory 440. According to an embodiment, the processor 430 may obtain, from the edge data network 2000, user FoV image packets including user FoV frame packets including information about a first user FoV frame obtained by encoding a user FoV image corresponding to the orientation information, and transmission error control packets. In this case, the user FoV image may be encoded using a first encoding parameter, and the first encoding parameter may be identified based on state information. The first encoding parameter is described above. Meanwhile, the transmission error control packets may be generated based on a transmission parameter identified by the edge data network 2000 based on the state information. The state information-based transmission parameter is described above.

The processor 430 may obtain, from the edge data network 2000, extra FoV image packets including information about a first extra FoV frame obtained by encoding an extra FoV image neighboring the user FoV image. In this case, the extra FoV image may be encoded using a second encoding parameter, and the second encoding parameter may be identified based on the state information. The second encoding parameter is described above.

Based on the user FoV image packets, the processor 430 may decode the first user FoV frame to reconstruct the user FoV image. Here, in a case in which some of the user FoV frame packets of the user FoV image packet are lost, the processor 430 may attempt to recover the lost packet based on the transmission error control packets included in the user FoV image packets, and, in a case in which the lost packet is successfully recovered, the processor 430 may decode the first user FoV frame further based on the recovered packet to reconstruct the user FoV image. In a case in which the recovery of the lost packet has failed, the processor 430 may selectively identify whether to request retransmission of the lost packet. For example, based on an RTT and a time period remaining until the completion of the decoding of the user FoV frame, the processor 430 may identify whether to request retransmission of the packet that has failed to be recovered. In a case of identifying to request retransmission of the packet that has failed to be recovered, the processor 430 may transmit, to the electronic device 1000, a request for retransmission of the packet that has failed to be recovered, and newly receive the packet. The processor 430 may decode the first user FoV frame further based on the newly received packet that has failed to be recovered and thus retransmitted, and thus reconstruct the first user FoV image.

The processor 430 may reproduce a part of the first partial image including the reconstructed first user FoV image and the first extra FoV image. That is, the processor 430 may obtain, from the sensing module 410, orientation information at a time point of the reproduction, obtain a part of the first partial image based on the orientation information, and reproduce the obtained part of the first partial image.

According to an embodiment, the memory 440 may include, but is not limited to, a first decoder module 441 and a second decoder module 442 storing instructions for decoding data, which is generated by encoding frames (e.g., the first user FoV frame and the first extra FoV frame) and then received from the edge data network 2000. Also, the memory 440 may include, but is not limited to, a user FoV image packet processing module 443 storing instructions for processing user FoV image packets obtained from the edge data network 2000. Also, the memory 440 may include, but is not limited to, an extra FoV image packet processing module 444 storing instructions for processing extra FoV image packets obtained from the edge data network 2000.

In addition, the memory 440 may include, but is not limited to, a network state monitoring module 445 storing instructions for transmitting, to the edge data network 2000, first network state information identified based on packets received from the edge data network 2000 and then processed, and an RTT measurement request message, obtaining information about a measured RTT (i.e., second network state information) by receiving a response to the information and the message, and transmitting, to the edge data network 2000, network information including the first network state information and the information about the measured RTT, periodically or as needed.

Also, the memory 440 may include, but is not limited to, a selective lost packet retransmission request module 446 storing instructions for, in a case in which a lost packet exists in some of the user FoV frame packets included in the user FoV image packets, and recovery of the lost packet has failed, requesting retransmission of the packet that has failed to be recovered, based on a time period remaining until completion of decoding of the user FoV image, and an RTT, or, in a case in which a lost packet exists in some of the extra FoV image packets, requesting retransmission of the lost packet based on a time period remaining until completion of decoding of the extra FoV image, and an RTT.

According to an embodiment, the edge data network 2000 may include a network interface 460, a processor 470, and a memory 480. However, components of the edge data network 2000 are not limited thereto, and the edge data network 2000 may include more components, or some components may be omitted therefrom.

The edge data network 2000 may obtain orientation information 452 from the electronic device 1000 using the network interface 460 and transmit, to the electronic device 1000, user FoV image packets 454 regarding a user FoV frame, and extra FoV image packets 456, which are generated by the edge data network 2000 performing encoding based on the orientation information 452. In this case, the user FoV image packets 454 and the extra FoV image packets 456 may be transmitted through separate transmission channels.

The processor 470 controls the overall operation of the edge data network 2000 by executing one or more instructions in the memory 480.

For example, the processor 470 may obtain the first partial image including the user FoV image corresponding to the orientation information, and the extra FoV image neighboring the user FoV image, and encode the user FoV image using at least one first encoding parameter to generate the first user FoV frame. In this case, the first user FoV frame may be an intra-coded frame (I frame) or a predictive-coded frame (P frame) (or a bidirectional predicted frame (B-frame)).

The processor 470 may encode the extra FoV image using at least one second encoding parameter to generate the first extra FoV frame.

In this case, the at least one first encoding parameter and second encoding parameter may be encoding parameters identified based on the state information including at least one of the orientation information and network state information.

The processor 470 may generate the user FoV image packets 454 including user FoV frame packets including information about a first user FoV frame, and transmission error control packets. The processor 470 may generate the transmission error control packets (e.g., an FEC packet) corresponding to some (a source packet) of the first user FoV frame packets, using a transmission parameter identified based on the state information (e.g., an FEC block size and an FEC code rate in a case in which the transmission error control packets are FEC packets).

The processor 470 may generate the extra FoV image packets 456 including information about a first extra FoV frame.

The processor 470 may transmit the user FoV image packets 454 and the extra FoV image packets 456 to the electronic device 1000. In this case, the user FoV image packets 454 and the extra FoV image packets 456 may be transmitted through separate transmission channels.

The processor 470 may periodically obtain orientation information and network state information, and identify an encoding parameter (e.g., the above-described first encoding parameter and second encoding parameter) and a transmission parameter, based on at least one of the orientation information and the network information. This is described below with reference to FIGS. 5 and 6.

When the processor 470 receives, from the electronic device 1000, a request for retransmission of a lost packet, the processor 470 may retransmit a lost packet to the electronic device 1000 in response to the request. This is described below with reference to FIGS. 7 and 12A, 12B, and 12C.

According to an embodiment, the memory 480 may include a first encoder module 481 and a second encoder module 482 storing instructions for encoding a user FoV image and an extra FoV image to be transmitted by the edge data network 2000 to the electronic device 1000, an FoV image packet processing module 483 for generating and processing user FoV image packets based on information about a user FoV frame, an extra FoV image packet processing module 484 for generating and processing extra FoV image packets based on information about an extra FoV frame, an encoding parameter and transmission parameter identification module 485 for identifying an encoding parameter and a transmission parameter based on state information, and a lost packet retransmission module 486 for retransmitting a lost packet to the electronic device 1000 in response to a request for retransmission of the lost packet received from the electronic device 1000. The memory 480 may store a VR sequence 487 including entire image data for a VR sequence, but the memory 480 is not limited thereto.

For example, the edge data network 2000 may store, in a database (DB), a VR sequence including all frames. The edge data network 2000 may identify the first partial image including the user FoV image and the extra FoV image from the VR sequence stored in the DB using the orientation information obtained from the electronic device 1000.

Figure 5:
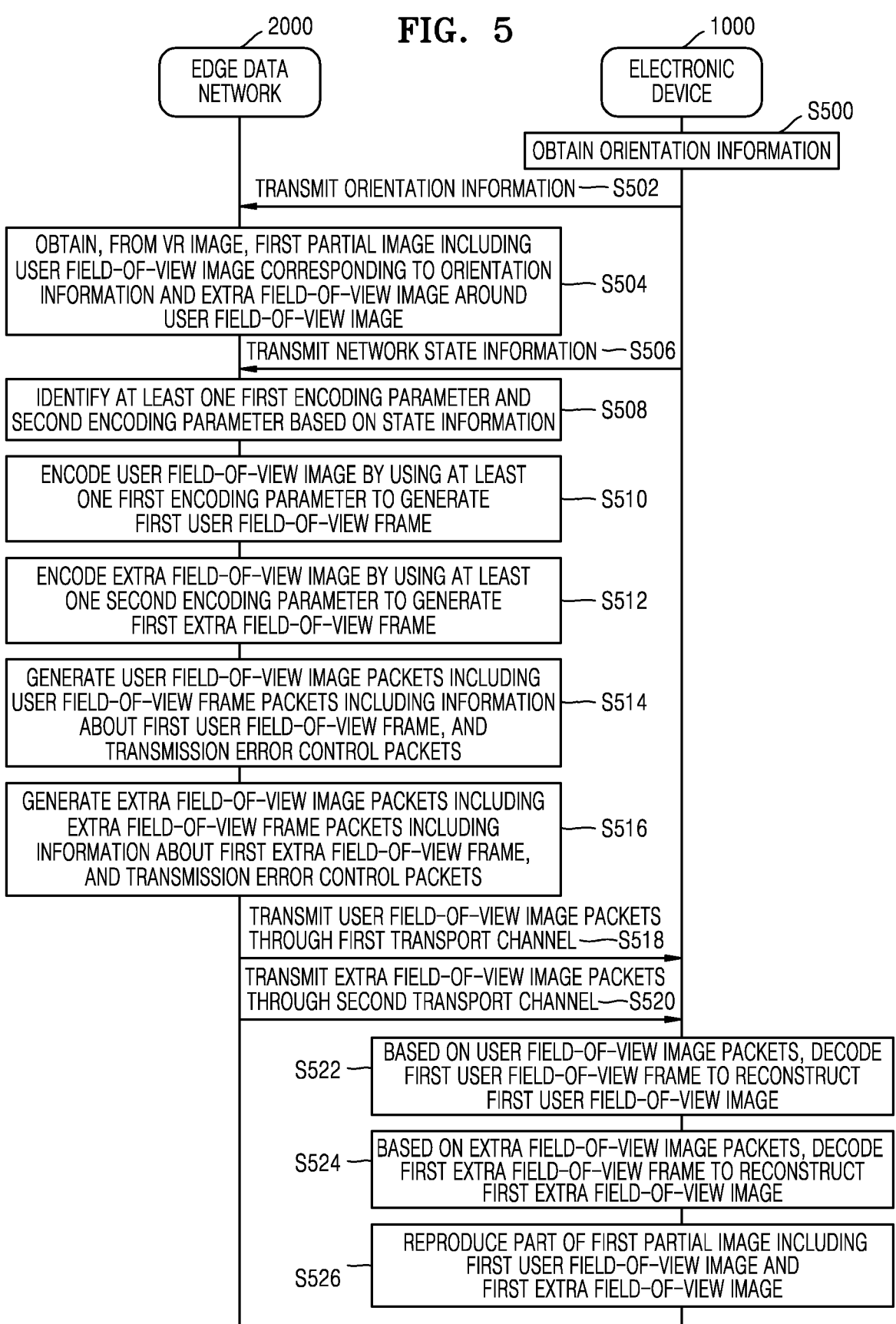
FIG. 5 is a flowchart illustrating an operation procedure between an example electronic device and an example edge data network, according to various embodiments.

FIG. 5 is a flowchart illustrating an operation procedure between an example electronic device and an example edge data network, according to various embodiments.

Referring to FIG. 5, in operation S500, the electronic device 1000 may obtain orientation information.

In operation S502, the electronic device 1000 may transmit the orientation information to the edge data network 2000. For example, the orientation information may be transmitted periodically. For example, the orientation information may be transmitted every 5 ms, but is not limited thereto, and may be transmitted upon a request from the edge data network 2000 or a change in previous orientation information. Meanwhile, the electronic device 1000 may transmit, to the edge data network 2000, a request for a user FoV image and an extra FoV image (i.e., a request for an extended FoV image), based on the orientation information, however, the electronic device 1000 does not always transmit a request for an extended FoV, and in some cases, may transmit only the orientation information without a request for an extended FoV. In addition, a request for a user FoV image and an extra FoV image may be periodically transmitted. In this case, the period may be identified considering a frame rate.

In operation S504, the edge data network 2000 may obtain, from a VR image, a first partial image including a user FoV image corresponding to the orientation information and an extra FoV image neighboring the user FoV image.

In operation S506, the electronic device 1000 may transmit network state information to the edge data network 2000. The network state information may be transmitted periodically, but is not limited thereto, and may be transmitted upon a request from the edge data network 2000 or a change in previous network information. Meanwhile, the network state information may, for example, include an available bandwidth, a packet loss rate, the number of consecutive lost packets, a throughput, etc., which are identified based on packets received and processed by the electronic device 1000. Also, the network state information may include information about an RTT measured based on an RTT measurement request transmitted from the electronic device 1000.

The network state information may be periodically updated according to a first period based on packets received and processed by the electronic device 1000, and the updated network state information may be periodically transmitted to the electronic device 1000 according to a second period. In this case, the first period may be shorter than the second period. For example, the first period may be 50 ms and the second period may be 2 s, but these periods are not limited thereto.

Meanwhile, network information identified based on packets received and processed by the electronic device 1000 may be transmitted every first period, and information about a measured RTT may be transmitted immediately after RTT measurement every second period. In this case, the first period may be shorter than the second period, but is not limited thereto. For example, the first period may be 2 s and the second period may be 5 s, but these periods are not limited thereto.

In operation S508, the edge data network 2000 may identify at least one first encoding parameter and second encoding parameter based on state information including at least one of the orientation information and the network state information. The first encoding parameter may be a parameter used to encode a user FoV image, and the second encoding parameter may be a parameter used to encode an extra FoV image.

For example, in a case of identifying, based on the previously obtained orientation information, that there is a large amount of movement of the electronic device 1000 (e.g., rotation of the user's head), the edge data network 2000 may identify that $R_{fps}$ and $R_{size}$ are greater than a first threshold. Here, $R_{fps}$ may denote a ratio of the frame rate of an extra FoV image to that of a user FoV image, and $R_{size}$ may denote a ratio of the frame data size of an extra FoV image to that of a user FoV image. For example, their values may be basically 0.5, but in a case of identifying that there is a large amount of movement of the electronic device 1000 (e.g., rotation of the user's head), they may be identified to be greater than 0.5.

On the contrary, in a case of identifying, based on the previously obtained orientation information, that there is a small amount of movement of the electronic device 1000 (e.g., rotation of the user's head), the edge data network 2000 may identify that $R_{fps}$ and $R_{size}$ are less than the first threshold. For example, their values may be basically 0.5, but in a case of identifying that there is a small amount of movement of the electronic device 1000 (e.g., rotation of the user's head), they may be identified to be less than 0.5.

The edge data network 2000 may identify the frame rate and the frame size of the user FoV image based on the state information, and may identify the frame rate and the frame size of the extra FoV image based on $R_{fps}$ and $R_{size}$.

In this case, the edge data network 2000 may first identify a transmission parameter, such as an FEC code rate and an FEC block size, based on the state information, and identify the frame rate and the frame size of the user FoV image based on the FEC block size and the FEC code rate. A description of the edge data network 2000 identifying the FEC block size and the FEC code rate based on the state information is provided below with reference to FIG. 6.

The edge data network 2000 may identify the frame rate and the frame data size of the user FoV image based on Equation 1 below.

$$(FR_{fov} * FS_{fov})(1 + N_{fec}/N_{block}) + (FR_{nonfov} * FS_{nonfov}) <= ABW$$

$$(FR_{fov} * FS_{fov})(1 + N_{fec}/N_{block} + R_{fps} * R_{size}) <= ABW$$

$$(FR_{fov} * FS_{fov}) <= ABW/(1 + N_{fec}/N_{block} + R_{fps} * R_{size}) \qquad \text{[Equation 1]}$$

Here, the frame data rate of the user FoV image (an image corresponding to an FoV area) is $FR_{fov}$, the frame size of the user FoV image (the image corresponding to the FoV area) is $FS_{fov}$, the frame rate of the extra FoV image (an image corresponding to a non-FoV area) is $FR_{nonfov}$, the frame size of the extra FoV image is $FS_{nonfov}$, $FR_{nonfov}$ may be $FR_{fov} * R_{fps}$, and $FS_{nonfov}$ may be $FS_{fov} * R_{size}$. ABW may denote an available bandwidth of the electronic device 1000. In addition, $N_{fec}$ may denote the number of FEC packets in an FEC block, $N_{block}$ may denote the number of packets in the FEC block (source packet+FEC packet), and thus, $N_{fec}/N_{block}$ may represent the FEC code rate of the user FoV image packets.

Accordingly, the frame data size (a parameter related to the quality of a frame) and the frame rate of the user FoV image may be identified by using $N_{fec}/N_{block}$, $R_{fps}$, $R_{size}$, etc., which are previously identified based on the state information.

The frame rate and the frame data size of the user FoV image may be identified by using various average bit rate (ABR) algorithms, based on Equation 1. In this case, examples of the ABR algorithms may include a method of first adjusting the frame data size and then adjusting the frame rate so as to prioritize image quality, or a method of sorting, in an order of sizes, data rates per second (e.g., bit rates per second), which are identified based on candidate frame rates and candidate frame data sizes, and identifying a frame rate and a frame data size that are similar to the maximum value of a data rate per second obtained by considering an available bandwidth.

For example, in a case in which it is determined to use 30 Mbps for FEC packet data and 70 Mbps for image data with respect to the entire data with 100 Mbps, the average frame data size may be 7 Mb/frame when the frame rate is 10 fps, and the average frame data size may be 3.5 Mb/frame when the frame rate is 20 fps.

In conclusion, after the amount of bits to be allocated to image data per second is determined based on the available bandwidth, any of various ABR techniques may be used.

In operation S510, the edge data network 2000 may encode the user FoV image using at least one first encoding parameter to generate a first user FoV frame.

In operation S512, the edge data network 2000 may encode the extra FoV image using at least one second encoding parameter to generate a first extra FoV frame.

In operation S514, the edge data network 2000 may generate user FoV image packets including user FoV frame packets including information about the first user FoV frame, and transmission error control packets.

In operation S516, the edge data network 2000 may generate extra FoV image packets including extra FoV frame packets including information about the first extra FoV frame, and transmission error control packets.

In operation S518, the edge data network 2000 may transmit the user FoV image packets to the electronic device 1000 through a first transport channel.

In operation S520, the edge data network 2000 may transmit the extra FoV image packets to the electronic device 1000 through a second transport channel.

Operations S522 to S526 correspond to operations S320 to S324 of FIG. 3, respectively, and thus, descriptions of operations S522 to S526 are not repeated here.

In this case, the first transport channel and the second transport channel may be different from each other, thus, the user FoV image packets and the extra FoV image packets may be processed in parallel and independently, and the electronic device 1000 may perform decoding based on the respective FoV image packets in parallel and independently.

Figure 6:
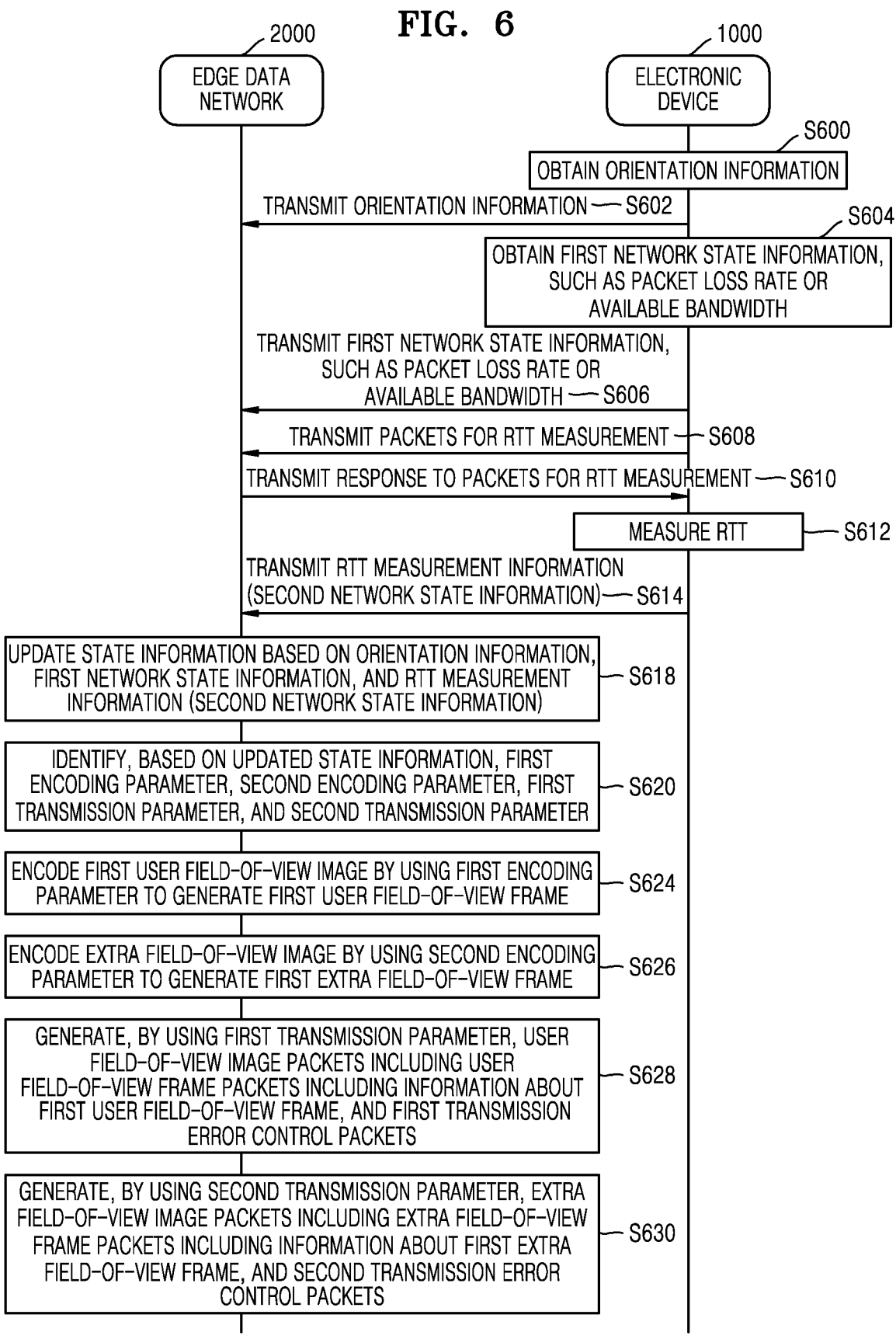
FIG. 6 is a flowchart illustrating a method, performed by an example electronic device, of streaming image content obtained from an example edge data network, according to various embodiments.

FIG. 6 is a flowchart illustrating a method, performed by an example electronic device, of streaming image content obtained from an example edge data network, according to various embodiments.

In operation S600, the electronic device 1000 may obtain orientation information. In this case, the orientation information may be obtained every first period. For example, the first period may be 5 ms, but is not limited thereto.

In operation S602, the electronic device 1000 may transmit the orientation information to the edge data network 2000. In this case, the orientation information may be transmitted every first period, but is not limited thereto, and may be transmitted less frequently than every first period. In this case, the period greater than the first period may be identified by considering the frame rate.

In operation S604, the electronic device 1000 may obtain first network state information, such as a packet loss rate, an available bandwidth, or the number of consecutive lost packets, based on a result of processing received packets. In this case, the network state information may be obtained and updated every second period. The second period may be 50 ms, but is not limited thereto.

In operation S606, the electronic device 1000 may transmit the first network state information (such as packet loss rate or available bandwidth) to the edge data network 2000. In this case, the first network state information may be transmitted every third period, and the third period may be greater than the second period. For example, the third period may be 2 s, but is not limited thereto.

In operation S608, the electronic device 1000 may transmit, to the edge data network 2000, packets for RTT measurement.

In operation S610, the edge data network 2000 may transmit a response to the packets for RTT measurement.

In operation S612, the electronic device 1000 may measure an RTT based on a time point at which the packets for RTT measurement are transmitted, and a time point at which the response to the packets for RTT measurement is received. That is, the electronic device 1000 may measure an RTT by resetting a timer when transmitting the packets for RTT measurement, and obtaining a value of the timer when the response to the packets for RTT measurement is received from the edge data network 2000. The RTT may correspond to a current latency. That is, an RTT indicates a time period required for a packet to be transmitted and received between a transmitting device and a receiving device, and may increase depending on network conditions (e.g., when a packet is dropped in a link layer, the packet may be retransmitted normally up to 8 to 9 times, the more frequent the retransmission, the longer the average RTT, and as the number of packets accumulated in a queue of a router node between the transmitting and receiving devices increases, the average RTT may increase due to a queuing delay). RTTs measured at different time points may be slightly different from each other, and thus, the average of RTTs measured at several time points may be used.

In operation S614, the electronic device 1000 may transmit RTT measurement information (second network state information) to the edge data network 2000. In this case, a series of processes from transmission of packets for RTT measurement to transmission of RTT measurement information may be performed every fourth period. In this case, the fourth period may be 5 s, but is not limited thereto.

In operation S618, the edge data network 2000 may update the state information based on the orientation information, the first network state information, and the RTT measurement information (the second network state information).

Meanwhile, the edge data network 2000 may receive information about a required latency from the electronic device 1000 after initially establishing a network connection with the electronic device 1000. The information about the required latency may also be included in the state information, and may be transmitted and updated whenever an application running on the electronic device 1000 is changed.

In operation S620, the edge data network 2000 may identify, based on the updated state information, a first encoding parameter, a second encoding parameter, a first transmission parameter, and a second transmission parameter. The first encoding parameter and the second encoding parameter are described above with reference to FIG. 5, and thus, the edge data network 2000 identifying the transmission parameters based on the state information is described below.

For example, the edge data network 2000 may identify an FEC block size based on Equation 2 below. The FEC block size $N_{block}(S_{block})$ may refer to the number of packets of an FEC block including a source packet and an FEC packet. Here, the FEC packet may be an example of a transmission error control packet generated for a user FoV image. The source packet is a packet including actual data, and may be a packet including information about at least a part of data generated by encoding a user FoV image (i.e., a first user FoV frame).

$$N_{block}(S_{block})=(\text{number of source packets}+\text{number of FEC packets})=(((\text{floor}(1/R_{loss}))+1) * \text{floor}(N_{loss}) \quad \text{[Equation 2]}$$

Here, $R_{loss}$ may denote a packet loss rate, and $N_{loss}$ may denote the number of packets in which packet loss occurs consecutively.

That is, when the packet loss rate is $R_{loss}$, the lost packets may be properly recovered only when one of $1/R_{loss}$ packets is an FEC packet.

Here, the FEC block size may be identified by considering a case in which packet loss occurs consecutively, and, when the number of packets in which packet loss occurs consecutively is $N_{loss}$, the FEC block size may be identified based on Equation 2 by considering that $N_{loss}$ packets is required in one FEC block.

Meanwhile, the edge data network 2000 may identify, based on Equation 3, the maximum number $N_{source}$ of source packets included in one FEC block.

$$N_{source}=\text{floor}(1/R_{loss}) * \text{floor}(N_{loss}) \quad \text{[Equation 3]}$$

The edge data network 2000 may identify, based on Equation 4, the number $N_{fec}$ of FEC packets included in one FEC block.

$$N_{fec}=\text{floor}(N_{loss}) \quad \text{[Equation 4]}$$

The edge data network 2000 may identify an FEC code rate $R_{fec}$ based on Equation 5.

$$R_{fec}=N_{source}/N_{block} \quad \text{[Equation 5]}$$

Here, the FEC block needs to be maintained to be within $T_{block}^{required}$, and the value thereof may be identified based on a required latency D (transport layer) for end-to-end transmission. For example, $T_{block}^{required}$ may be identified as 12 ms by considering a frame interval of 90 fps.

In this case, the maximum FEC block size $S_{block}^{max}$ ($N_{block}^{max}$) may be identified by floor(ABW * $T_{block}^{required}$/ MSS). A maximum segment size (MSS) denotes the maximum size of a packet (segment), and may be expressed in bytes. In a case in which the currently identified FEC block size is greater than the maximum FEC block size, the currently identified FEC block size may be modified to be the maximum FEC block size. In this case, in consideration of the FEC code rate, the size of the current FEC block may be further modified to be within the maximum FEC block size and thus have integer numbers of FEC packets and source packets.

Meanwhile, all source packets in one frame needs to be protected by FEC packets. Accordingly, even in a case in which the number $N_{frame}$ of packets inserted into one FEC block among packets of one frame is less than $N_{source}$, the source packets may be protected by FEC packets as many as the number of FEC packets in a case in which the number of source packets is $N_{source}$. In this case, packets of the next frame and packets of the current frame cannot be source packets in one FEC block.

On the other hand, in a case in which the number $N_{frame}$ of packets inserted into one FEC block is less than $N_{source}$, the number of inserted FEC packets may be significantly greater than the number of source packets, which may be inefficient for recovery of lost packets in each FEC block.

Accordingly, the size of the FEC block may be modified by considering the number of FEC blocks.

For example, when the number of packets included in frame x is $N_{frame(x)}$, the edge data network 2000 may identify, based on Equation 6, the number $N_{block}^{frame(x)}$ of FEC blocks for transmitting frame x.

$$N_{block}^{frame(x)} = ceil(N_{frame}/N_{source}) \quad \text{[Equation 6]}$$

In order to similarly adjust the number of source packets to be inserted into each FEC block, the modified number $N'_{source}$ of source packets for each FEC block may be identified based on Equation 7.

$$N'_{source} = Ceil(N_{frame}/N_{block}^{frame(x)}) \quad \text{[Equation 7]}$$

For example, in a case in which the edge data network 2000 identifies the size $N_{block}$ of an FEC block as 22 and uses an FEC scheme of (20, 22), and the number of source packets of a frame to be transmitted is 42, the number of FEC blocks is 3, and the numbers of source packets of the FEC blocks are 20, 20, and 2, respectively. However, when the above-described method of modifying an FEC block size for each frame is used, $N'_{source}$ is modified to be ceil(42/3) =14, and thus, the number of FEC blocks is the same, but the number of source packets of the FEC blocks may be 14, 14, and 14, respectively. In this case, the number of FEC packets in each FEC block is 2, which is the same as before, however, the FEC block size is reduced, and accordingly, packet recovery capability may be further improved.

In operation S624, the edge data network 2000 may encode a user FoV image using the first encoding parameter to generate a first user FoV frame. Here, the user FoV image may refer to an image having a user FoV angle identified according to the size of the viewport area of the electronic device 1000 based on latest orientation information included in an image request transmitted from the electronic device 1000.

In operation S626, the edge data network 2000 may encode an extra FoV image using the second encoding parameter to generate a first extra FoV frame. Here, the extra FoV image may be an image having a certain FoV around the user FoV image.

In operation S628, the edge data network 2000 may generate, using the first transmission parameter, user FoV image packets including user FoV frame packets including information about the first user FoV frame, and first transmission error control packets. For example, in a case in which the transmission error control packet is FEC packets, the transmission parameter may be the FEC block size and the FEC code rate described above, and transmission error control packets (i.e., FEC packets) corresponding to the user FoV frame packets (i.e., source packets) are generated by using the transmission parameter identified based on the state information.

In operation S630, the edge data network 2000 may generate, using the second transmission parameter, extra FoV image packets including extra FoV frame packets including information about the first extra FoV frame, and second transmission error control packets.

Figure 7:
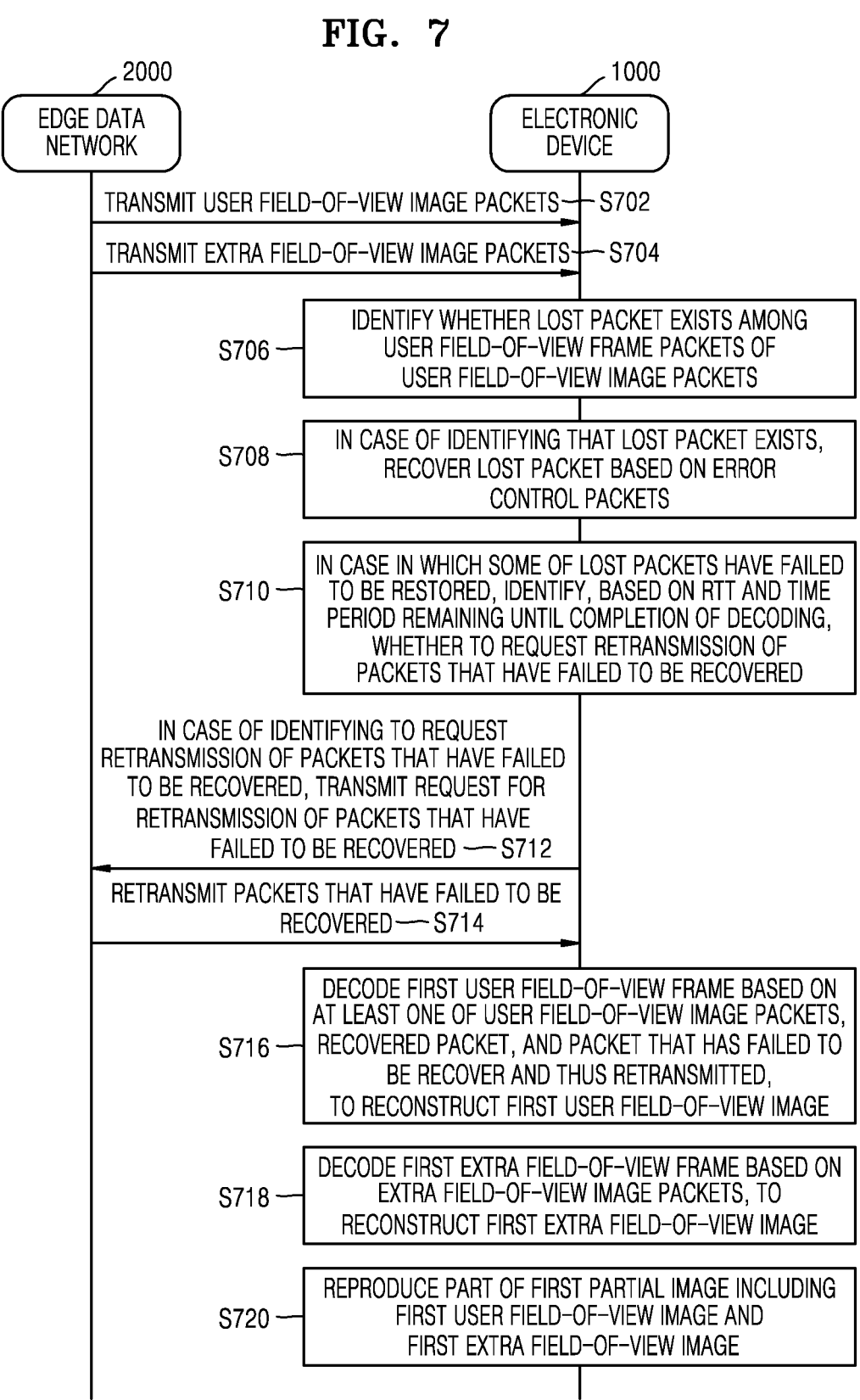
FIG. 7 is a flowchart illustrating a method, performed by an example electronic device, of streaming image content obtained from an example edge data network, according to various embodiments.

FIG. 7 is a flowchart illustrating a method, performed by an example electronic device, of streaming image content obtained from an example edge data network, according to various embodiments.

In operation S702, the edge data network 2000 may transmit user FoV image packets to the electronic device 1000. Descriptions of User FoV image packets being generated based on orientation information obtained from the electronic device 1000 and then transmitted to the edge data network 2000 are provided above.

In operation S704, the edge data network 2000 may transmit extra FoV image packets to the electronic device 1000.

In operation S706, the electronic device 1000 may identify whether a lost packet exists in a user FoV frame of the user FoV image packets. In this case, in order to identify whether a lost packet exists, the electronic device 1000 may identify whether a packet is received within a preset time period. This is because, when the packet is received after the preset time period (e.g., when the packet is received after the corresponding image is decoded and reproduced), the packet cannot be used. For example, the electronic device 1000 may identify whether a lost packet exists by identifying whether there is an unreceived packet in a previous FEC block at a time point at which the second packet of the current FEC block is received so as to identify whether a lost packet exists in the previous FEC block. That is, sequence numbers exist in all packets, and the range of the sequence numbers of source packets protected by each FEC packet may be identified from the FEC packet. However, because the order of packets coming through a network may be changed, rather than identifying, as a lost packet, a packet that has not yet arrived as soon as an FEC packet is received, the electronic device 1000 having received the FEC packet may wait until 2 or 3 packets having sequence numbers greater than that of the FEC packet arrive, considering that the packets may be received in an order that is different from the order of the packets being transmitted from a transmitting side, and when there is a lost packet among the packets of the sequence numbers protected by the FEC packet, the electronic device 1000 may perform packet recovery using the FEC packet.

In operation S708, in a case of identifying that a lost packet exists, the electronic device 1000 may recover the lost packet based on an error control packet.

In operation S710, in a case in which some of lost packets have failed to be recovered, the electronic device 1000 may identify, based on an RTT and a time period remaining until a user FoV image is obtained by performing decoding (i.e., until an image obtained by performing decoding is reproduced), whether to request retransmission of the packets that have failed to be recovered. For example, in a case in which a value obtained by adding a certain margin value (e.g., may be 0.5*RTT, but is not limited thereto) to the latest measured RTT is less than the time period (Timer(nextFrame)) remaining until decoding of the user FoV image (i.e., reproduction of the next frame), the electronic device 1000 may identify to request retransmission of the packets that have failed to be recovered. Here, a timer may be set to start, from a time point at which every frame is decoded, counting a time period set considering the frame rate of the frame, and the remaining time period until the timer expires may be Timer (nextFrame).

In operation S712, in a case of identifying to request retransmission of the packets that have failed to be recovered, the electronic device 1000 may transmit, to the edge data network 2000, a request for retransmission of the packets that have failed to be recovered. In a case of identifying not to request retransmission of the packets that have failed to be recovered, the electronic device 1000 may not transmit, to the edge data network 2000, a request for retransmission of the packets that have failed to be recovered.

In operation S714, in response to the request for retransmission of the packets that have failed to be recovered, the edge data network 2000 may retransmit, to the electronic device 1000, the packets that have failed to be recovered.

In operation S716, the electronic device 1000 may decode the first user FoV frame based on at least one of the user FoV image packets, a recovered packet, and a packet that has failed to be recovered and thus retransmitted, to reconstruct a first user FoV image.

In operation S718, the electronic device 1000 may decode a first extra FoV frame based on the extra FoV image packets, to reconstruct a first extra FoV image. In this case, the extra FoV image packets may not include any error control packet, and thus a lost packet cannot be recovered. However, the electronic device 1000 may request a request for retransmission of the packet. In this case, operations similar to operations S710 to S714 may be performed. The present disclosure is not limited thereto, and the extra FoV image packets may include an error control packet. In a case in which the extra FoV image packets include an error control packet, operations similar to operations S706 to S714 may be performed.

In identifying whether a packet is a lost packet, OrderingWindowSize may be considered. OrderingWindowSize may indicate the number of packets, which are received in an order different from the order in which they have been transmitted, for which to wait.

Packets transmitted by a transmitting side may be received in an order different from the order in which they are transmitted. For example, in a case in which the transmitting side has sequentially transmitted packets 1,2,3,4, and 5, and the receiving side sequentially receives packets 2,1,3,5, and 4, the receiving side may wait until packets as many as OrderingWindowSize are received, without regarding packet 1 as a lost packet despite packet 2 being received first. For example, in a case in which OrderingWindowSize of the receiving side is W, and packet X is not received while the receiving side is waiting for packet X, the receiving side may wait for packet (X+W−1) to be received, and, upon a packet with a sequence number greater than (X+W−1) being received, identify packet X as a lost packet and then wait for packet (X+1) to be received. In a case in which OrderingWindowSize is 0, all packets being received in an order different from the order in which they have been transmitted are identified as lost packets, and thus, OrderingWindowSize needs to be appropriately determined based on an RTT.

In operation S720, the electronic device 1000 may reproduce a part of a first partial image including the first user FoV image and the first extra FoV image.

FIG. 8A is a flowchart illustrating a method, performed by an example edge data network, of streaming image content, according to various embodiments.

In operation S802, the edge data network 2000 may obtain orientation information from the electronic device 1000 connected to the edge data network 2000.

In operation S804, the edge data network 2000 may obtain a first partial image including a user FoV image corresponding to the orientation information and an extra FoV image neighboring (around) the user FoV image.

In operation S806, the edge data network 2000 may encode the user FoV image using at least one first encoding parameter to generate a first user FoV frame. The first encoding parameter may, for example, be a frame data rate, a frame size, etc., and may be identified based on state information including at least one of network state information and the orientation information.

In operation S808, the edge data network 2000 may encode the extra FoV image using at least one second encoding parameter to generate a first extra FoV frame. The second encoding parameter may, for example, be a frame data rate, a frame size, etc., and may be identified based on the first encoding parameter and a ratio of the first encoding parameter to the second encoding parameter. The second encoding parameter may be identified based on the state information including at least one of the network state information and the orientation information.

In operation S810, the edge data network 2000 may transmit, to the electronic device 1000, user FoV image packets including user FoV frame packets including information about the first user FoV frame, and first transmission error control packets determined using a first transmission parameter.

In operation S812, the edge data network 2000 may transmit, to the electronic device 1000, extra FoV image packets including extra FoV frame packets including information about the first extra FoV frame, and second transmission error control packets determined using a second transmission parameter. In this case, the user FoV image packets and the extra FoV image packets may be transmitted through different transport channels.

FIG. 8B is a flowchart illustrating a method, performed by an example edge data network, of streaming image content, according to various embodiments.

In operation S822, the edge data network 2000 may obtain network state information regarding a network between the edge data network 2000 and the electronic device 1000 connected to the edge data network 2000.

In this case, the network state information may include state parameters. The state parameters may include, but are not limited to, a throughput for processing tasks, such as data transmission and reception through a network connection, which is determined by considering a situation of a network, a situation of the edge data network 2000, or a situation of the electronic device 1000.

The throughput may refer, for example, to an amount of data per unit time that may be processed in an end-to-end manner (e.g., a data-related task by the edge data network 2000, data transmission through a network, and processing of a data-related task by the electronic device 1000). For example, the throughput may refer to a size or speed per unit time regarding data transmitted over a network. Alternatively, the throughput may refer to the size of data processed by the edge data network 2000 and the electronic device 1000, or the speed of such data processing. The throughput may be identified based on at least one evaluation index (e.g., the number of received packets, bytes, or bits per unit time).

For example, the electronic device 1000 may measure the total sum of data sizes received per unit time by a receiving module based on a transport protocol, and transmit, to the edge data network 2000, throughput information including the measured value. However, the present disclosure is not limited thereto, and those of skill in the art will understand that various modules may measure a throughput of related data and transmit, to the edge data network 2000, information about the measured throughput.

In operation S824, the edge data network 2000 may obtain orientation information from the electronic device 1000 connected to the edge data network 2000.

In operation S826, the edge data network 2000 may determine, based on the obtained network state information and orientation information, the sizes and positions of a user FoV image and an extra FoV image neighboring (around) the user FoV image.

The edge data network 2000 may identify the user FoV image based on the orientation information. For example, the edge data network 2000 may identify the position of the user FoV image (e.g., the coordinate position of the center of the image) based on the received orientation information. The edge data network 2000 may receive, from the electronic device 1000, capability information of the electronic device 1000, identify the size of the viewport area of the electronic device 1000 according to the capability information, and identify, as the size of the user FoV image, the identified size of the viewport area.

The edge data network 2000 may identify, based on the network state information, the size and position of the extra FoV image neighboring the user FoV image. In a case in which the value of at least one state parameter included in the network state information is less than or equal to a first threshold, the edge data network 2000 may identify the size and position of the extra FoV image neighboring the user FoV image corresponding to the at least one state parameter less than or equal to the first threshold, and, in a case in which the value of at least one state parameter included in the network state information is greater than or equal to a second threshold, the edge data network 2000 may identify the size and position of the extra FoV image neighboring the user FoV image corresponding to the at least one state parameter greater than or equal to the second threshold. In this case, the second threshold may be a value set on the premise that at least one state parameter before the current time point is less than or equal to the second threshold. The first threshold may be equal to the second threshold, but is not limited thereto. In this case, the size of the extra FoV image corresponding to the at least one state parameter less than or equal to the first threshold may be greater than the size of the extra FoV image corresponding to the at least one state parameter greater than the second threshold.

In operation S828, the edge data network 2000 may obtain a first partial image including the user FoV image and the extra FoV image neighboring (around) the user FoV image, which are determined based on the sizes and positions of the user FoV image and the extra FoV image neighboring the user FoV image.

In operation S830, the edge data network 2000 may encode the user FoV image using at least one first encoding parameter to generate a first user FoV frame. The first encoding parameter may, for example, be a frame data rate, a frame size, etc., and may be identified based on state information including at least one of network state information and the orientation information.

In operation S832, the edge data network 2000 may encode the extra FoV image using at least one second encoding parameter to generate a first extra FoV frame. The second encoding parameter may, for example, be a frame data rate, a frame size, etc., and may be identified based on the first encoding parameter and a ratio of the first encoding parameter to the second encoding parameter. The second encoding parameter may be identified based on the state information including at least one of the network state information and the orientation information.

In operation S834, the edge data network 2000 may transmit, to the electronic device 1000, user FoV image packets including user FoV frame packets including information about the first user FoV frame, and first transmission error control packets.

In operation S836, the edge data network 2000 may transmit, to the electronic device 1000, extra FoV image packets including extra FoV frame packets including information about the first extra FoV frame, and second transmission error control packets.

FIG. 9 is a flowchart illustrating a method, performed by an example edge data network, of streaming image content, according to various embodiments.

In operation S902, the edge data network 2000 may obtain orientation information from the electronic device 1000.

In operation S904, the edge data network 2000 may obtain a first partial image including a user FoV image corresponding to the orientation information and an extra FoV image neighboring (around) the user FoV image.

In operation S906, the edge data network 2000 may obtain network state information from the electronic device 1000. In this case, the network state information may be periodically obtained from the electronic device 1000, but is not limited thereto.

In operation S908, the edge data network 2000 may identify a first encoding parameter, a second encoding parameter, a first transmission parameter, and a second transmission parameter, based on state information including at least one of the orientation information and the network state information.

In operation S910, the edge data network 2000 may encode a user FoV image using the first encoding parameter to generate a first user FoV frame.

In operation S912, the edge data network 2000 may encode an extra FoV image using the second encoding parameter to generate a first extra FoV frame.

In operation S914, the edge data network 2000 may generate, using the first transmission parameter, user FoV image packets including user FoV frame packets including information about the first user FoV frame, and first transmission error control packets.

In operation S916, the edge data network 2000 may generate, using the second transmission parameter, extra FoV image packets including extra FoV frame packets including information about the first extra FoV frame, and second transmission error control packets.

In operation S918, the edge data network 2000 may transmit the user FoV image packets to the electronic device 1000.

In operation S920, the edge data network 2000 may transmit the extra FoV image packets to the electronic device 1000.

FIG. 10 is a flowchart illustrating a method, performed by an example edge data network, of streaming image content, according to various embodiments.

In operation S1002, the edge data network 2000 may obtain orientation information from the electronic device 1000 connected to the edge data network 2000.

In operation S1004, the edge data network 2000 may obtain a first partial image including a user FoV image corresponding to the orientation information and an extra FoV image neighboring (around) the user FoV image.

In operation S1006, the edge data network 2000 may encode the user FoV image using at least one first encoding parameter to generate a first user FoV frame.

In operation S1008, the edge data network 2000 may encode the extra FoV image using at least one second encoding parameter to generate a first extra FoV frame.

In operation S1010, the edge data network 2000 may transmit, to the electronic device 1000, user FoV image packets including user FoV frame packets including information about the first user FoV frame, and first transmission error control packets.

In operation S1012, the edge data network 2000 may transmit, to the electronic device 1000, extra FoV image packets including extra FoV frame packets including information about the first extra FoV frame, and second transmission error control packets.

In operation S1014, the edge data network 2000 may receive, from the electronic device 1000, a request for retransmission of a packet that has failed to be recovered based on the error control packets. That is, the electronic device 1000 may attempt to recover a lost packet based on the error control packets received from the edge data network 2000, and, in a case in which the lost packet has failed to be recovered, the electronic device 1000 may selectively transmit, to the edge data network 2000, a request for retransmission of the packet that has failed to be recovered.

In operation S1016, in response to the request for retransmission of the packet that has failed to be recovered, the edge data network 2000 may retransmit, to the electronic device 1000, the packet that has failed to be recovered.

FIG. 11 is a flowchart illustrating a method, performed by an example electronic device, of streaming image content obtained from an example edge data network, according to various embodiments.

In operation S1102, the electronic device 1000 may transmit orientation information to the edge data network 2000.

In operation S1104, the electronic device 1000 may obtain, from the edge data network 2000, user FoV image packets including user FoV frame packets including information about a first user FoV frame obtained by encoding a user FoV image corresponding to the orientation information, and first transmission error control packets. In this case, the user FoV image packets may be obtained from the edge data network 2000 through a first transport channel.

In operation S1106, the electronic device 1000 may obtain, from the edge data network 2000, extra FoV image packets including extra FoV frame packets including information about a first extra FoV frame obtained by encoding an extra FoV image neighboring (around) the user FoV, and second transmission error control packets. In this case, the extra FoV image packets may be obtained from the edge data network 2000 through a second transport channel.

In operation S1108, based on the user FoV image packets, the electronic device 1000 may decode the first user FoV frame to reconstruct a first user FoV image.

In operation S1110, based on the extra FoV image packets, the electronic device 1000 may decode a first extra FoV frame to reconstruct a first extra FoV image.

In operation S1112, the electronic device 1000 may reproduce at least a part of the first partial image including the first user FoV image and the first extra FoV image. That is, the electronic device 1000 may obtain the orientation information at a time point of reproduction and reproduce a part of the first partial image based on the orientation information.

Figure 12A:
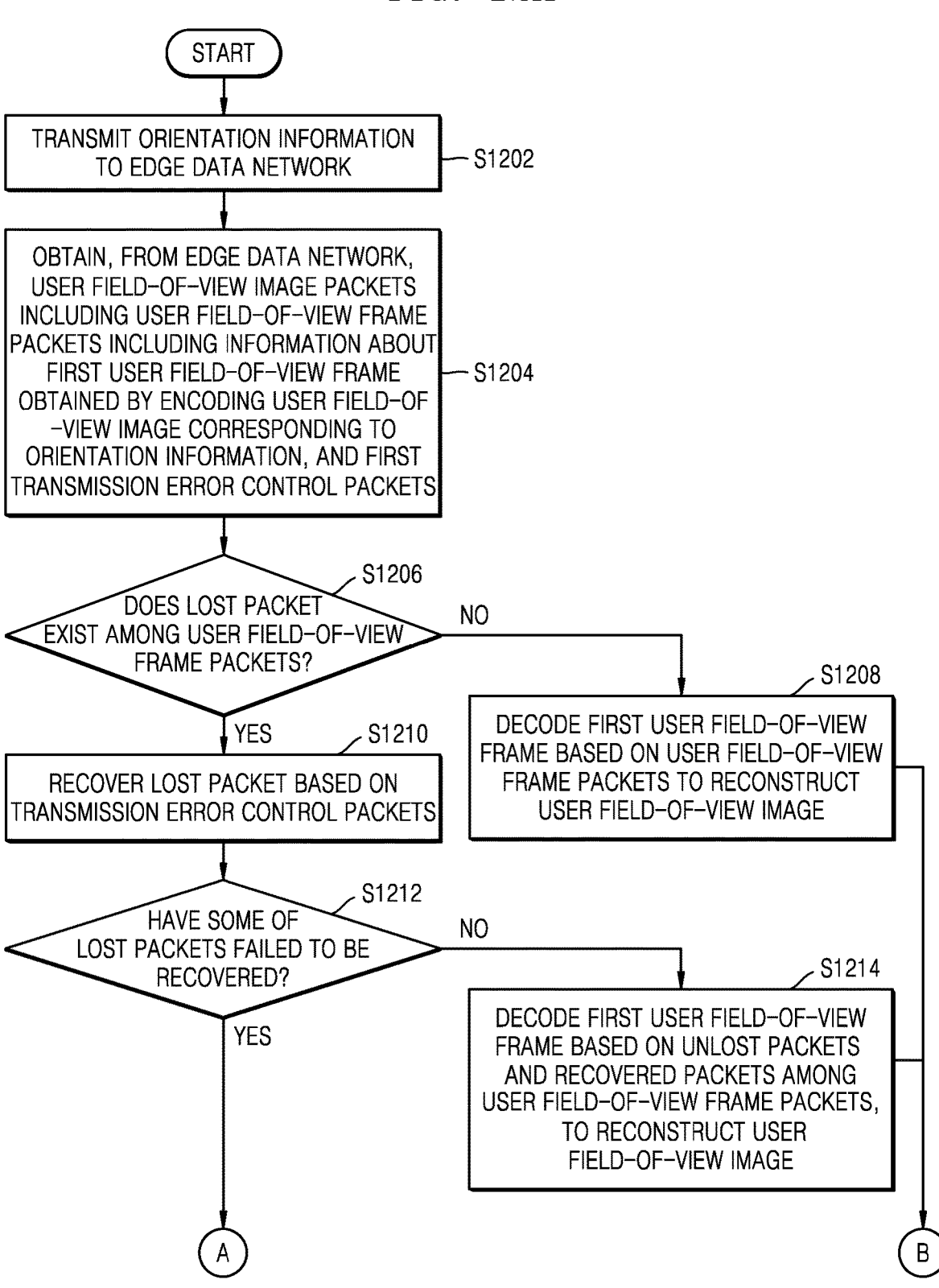
FIGS. 12A and 12B are flowcharts illustrating a method, performed by an example electronic device, of streaming image content obtained from an example edge data network, according to various embodiments.
Figure 12B:
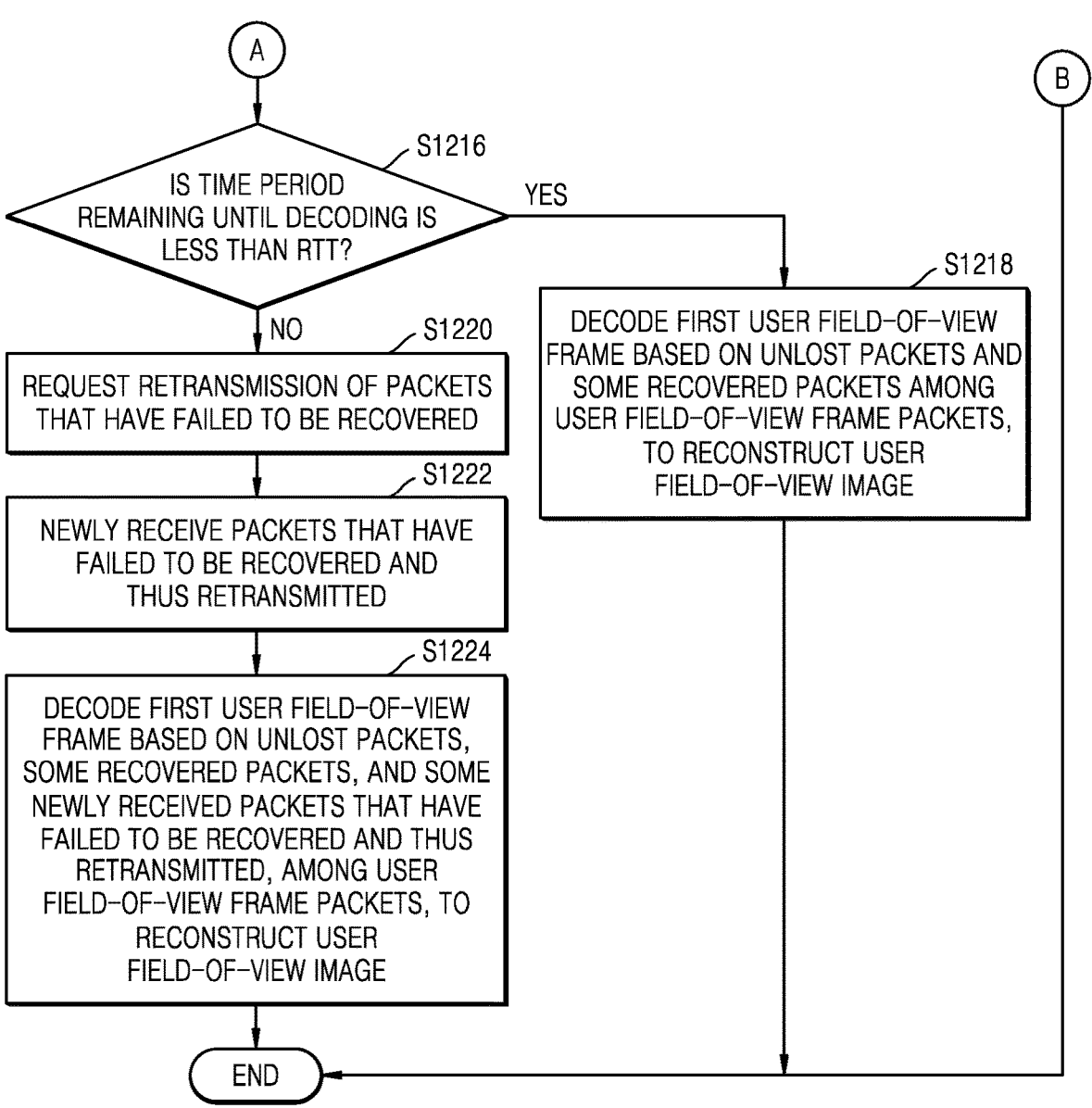

FIGS. 12A and 12B are flowcharts illustrating a method, performed by an example electronic device, of streaming image content obtained from an example edge data network, according to various embodiments.

In operation S1202, the electronic device 1000 may transmit orientation information to the edge data network 2000.

In operation S1204, the electronic device 1000 may obtain, from the edge data network 2000, user FoV image packets including user FoV frame packets including information about a first user FoV frame obtained by encoding a user FoV image corresponding to the orientation information, and transmission error control packets.

In operation S1206, the electronic device 1000 may identify whether a lost packet exists among the user FoV frame packets.

In a case in which it is identified, in operation S1206, that no lost packet exists among the user FoV frame packets, in operation S1208, the electronic device 1000 may decode the first user FoV frame based on the user FoV frame packets to reconstruct the user FoV image.

In a case in which it is identified, in operation S1206, that a lost packet exists among the user FoV frame packets, in operation S1210, the electronic device 1000 may recover the lost packet based on the transmission error control packets. In this case, the transmission error control packet may be a packet having an error recovery function.

In operation S1212, the electronic device 1000 may identify whether some of lost packets have failed to be recovered.

In a case in which it is identified, in operation S1212, that no lost packets have failed to be recovered, in operation S1214, the electronic device 1000 may decode the first user FoV frame based on unlost packets and recovered packets among the user FoV frame packets, to reconstruct the user FoV image.

In operation S1216, the electronic device 1000 may identify whether a time period remaining until decoding of the user FoV image (i.e., until reproduction of the next frame) is less than an RTT. In this case, the electronic device 1000 may identify whether the remaining time period is less than a value obtained by adding a certain margin value to the RTT.

In a case in which it is identified, in operation S1216, that the remaining time period is less than the RTT, in operation S1218, the electronic device 1000 may decode the first user FoV frame based on unlost packets and some recovered packets among the user FoV frame packets, to reconstruct the user FoV image. In this case, due to some lost packets, the image quality of the reconstructed user FoV image may be deteriorated.

In a case in which it is identified, in operation S1216, that the remaining time period is not less than the RTT, in operation S1220, the electronic device 1000 may transmit, to the edge data network 2000, a request for retransmission of the packets that have failed to be recovered.

In operation S1222, the electronic device 1000 may newly receive the packets that have failed to be recovered and thus retransmitted in response to the request for retransmission of the packets that have failed to be recovered.

In operation S1224, the electronic device 1000 may decode the first user FoV frame based on unlost packets, some recovered packets, and some newly received packets that have failed to be recovered and thus retransmitted, among the user FoV frame packets, to reconstruct the user FoV image. Meanwhile, in a case in which a packet that has failed to be recovered is not received until completion of decoding of the user FoV frame, the user viewing FoV image may be reconstructed using only the other packets.

Figure 12C:
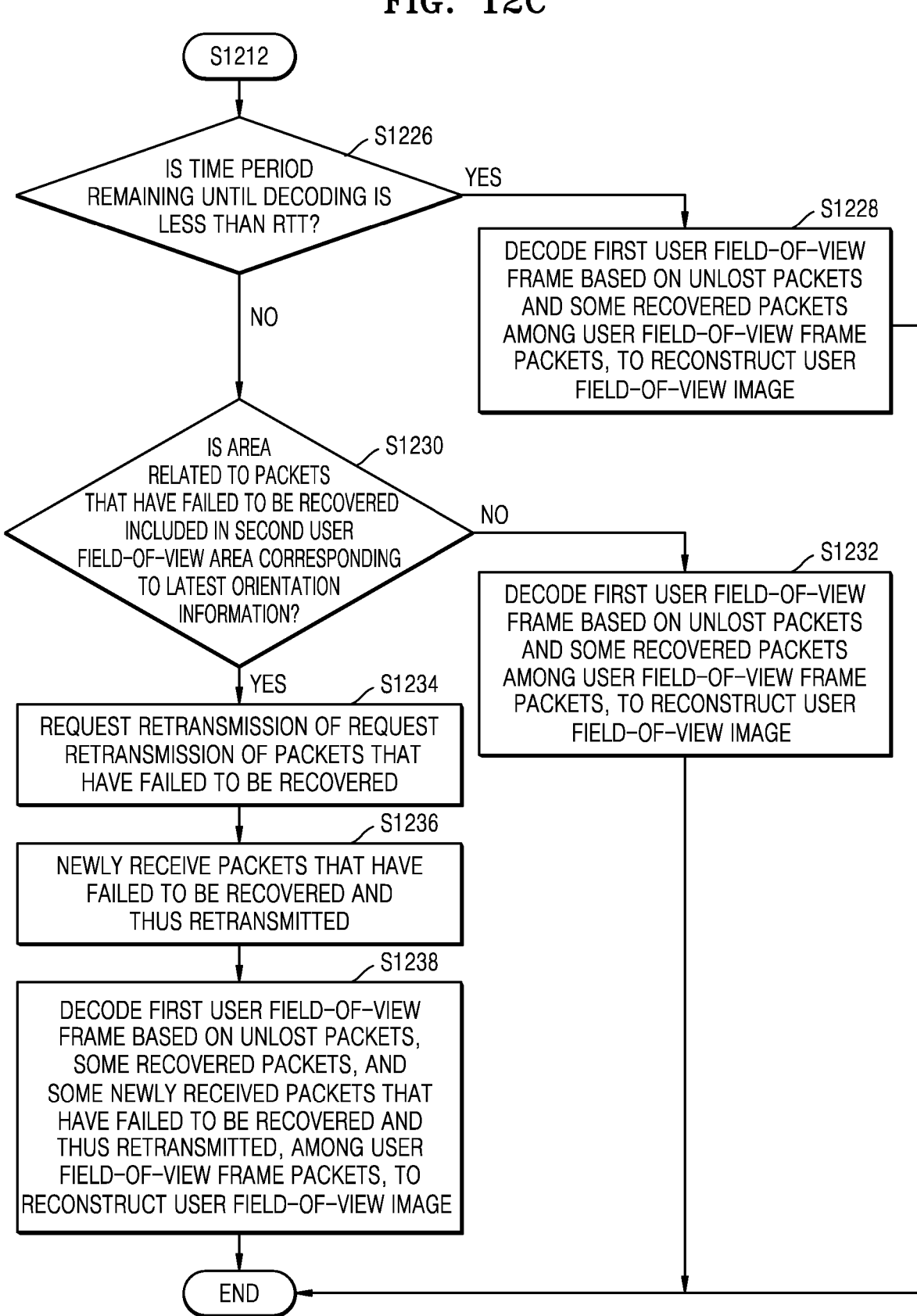
FIG. 12C is a flowchart illustrating a method, performed by an example electronic device, of streaming image content obtained from an example edge data network, according to various embodiments.

FIG. 12C is a flowchart illustrating a method, performed by an example electronic device, of streaming image content obtained from an example edge data network, according to various embodiments.

In operation S1226, the electronic device 1000 may identify whether a time period remaining until decoding of the user FoV image is less than the RTT.

In a case in which it is identified, in operation S1226, that the remaining time period is less than the RTT, in operation S1228, the electronic device 1000 may decode the first user FoV frame based on unlost packets and some recovered packets among the user FoV frame packets, to reconstruct a first user FoV image.

In a case in which it is identified, in operation S1226, that the remaining time period is not less than the RTT, in operation S1230, the electronic device 1000 may identify whether an area related to the packets that have failed to be recovered is included in a second user FoV area corresponding to latest orientation information. The header of a packet may include information about the position of an encoding block related to the packet, and, in a case in which the positions of blocks of packets other than packets that have failed to be recovered are identified, and the positions of some empty blocks are identified, the positions of blocks related to the packet that have failed to be recovered may be identified, and based on these positions, areas related to the packets that have failed to be recovered may be identified. That is, after identifying that packets corresponding to one frame have been received, the electronic device 1000 may identify, based on information about the position of encoding blocks included in the headers of the received packets, which blocks in the frame are related to the packets that have failed to be recovered.

In a case in which it is identified, in operation S1230, that the area related to the packets that have failed to be recovered is not included in the second user FoV area, in operation S1232, the electronic device 1000 may decode the first user FoV frame based on unlost packets and some recovered packets among the user FoV frame packets, to reconstruct the first user FoV image.

In a case in which it is identified, in operation S1230, that the area related to the packets that have failed to be recovered is included in the second user FoV area, in operation S1234, the electronic device 1000 may transmit, to the edge data network 2000, a request for retransmission of the packets that have failed to be recovered.

In operation S1236, the electronic device 1000 may newly receive, from the edge data network 2000, the packets that have failed to be recovered and thus retransmitted in response to the request for retransmission of the packets that have failed to be recovered.

In operation S1238, the electronic device 1000 may decode the first user FoV frame based on unlost packets, some recovered packets, and some newly received packets that have failed to be recovered and thus retransmitted, among the user FoV frame packets, to reconstruct the first user FoV image.

Meanwhile, although the above description has been made on the premise that the identifying in operation S1226 has a higher priority than that of the identifying in operation S1230, the present disclosure is not limited thereto, and those of skill in the art may understand that the priority may be changed.

Meanwhile, it is described above, with reference to FIGS. 12A, 12B, and 12C, that the electronic device 1000 recovers some of the user FoV frame packets based on the transmission error control packets included in the user FoV image packets or requests retransmission of some packets, and the present disclosure is not limited thereto, and it may be understood that the electronic device 1000 may, in a similar manner, recover some of the extra FoV frame packets based on the transmission error control packets included in the extra FoV image packets or request retransmission of some packets.

Figure 13:
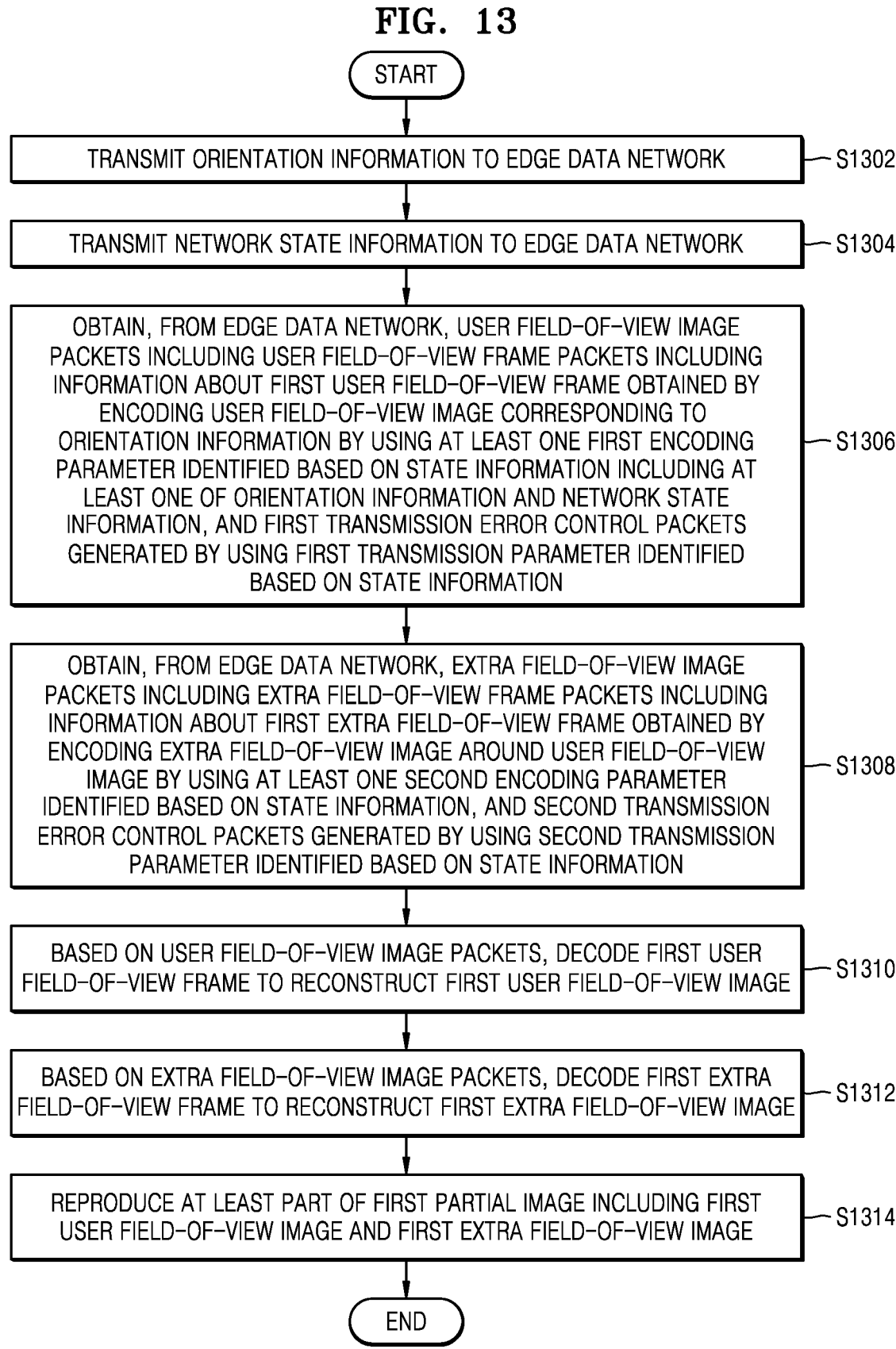
FIG. 13 is a flowchart illustrating a method, performed by an example electronic device, of streaming image content obtained from an example edge data network, according to various embodiments.

FIG. 13 is a flowchart illustrating a method, performed by an example electronic device, of streaming image content obtained from an example edge data network, according to various embodiments.

In operation S1302, the electronic device 1000 may transmit orientation information to the edge data network 2000.

In operation S1304, the electronic device 1000 may transmit network state information to the edge data network 2000.

In operation S1306, the electronic device 1000 may obtain, from the edge data network 2000, user FoV image packets including user FoV frame packets including information about a first user FoV frame obtained by encoding a user FoV image corresponding to the orientation information by using at least one first encoding parameter identified based on state information including at least one of the orientation information and the network state information, and first transmission error control packets generated using a first transmission parameter identified based on the state information.

In operation S1308, the electronic device 1000 may obtain, from the edge data network 2000, extra FoV image packets including extra FoV frame packets including information about a first extra FoV frame obtained by encoding an extra FoV image neighboring the user FoV image by using at least one second encoding parameter identified based on the state information, and second transmission error control packets generated using a second transmission parameter identified based on the state information.

In operation S1310, based on the user FoV image packets, the electronic device 1000 may decode the first user FoV frame to reconstruct a first user FoV image.

In operation S1312, based on the extra FoV image packets, the electronic device 1000 may decode a first extra FoV frame to reconstruct a first extra FoV image.

In operation S1314, the electronic device 1000 may reproduce at least a part of the first partial image including the first user FoV image and the first extra FoV image.

Figure 14:
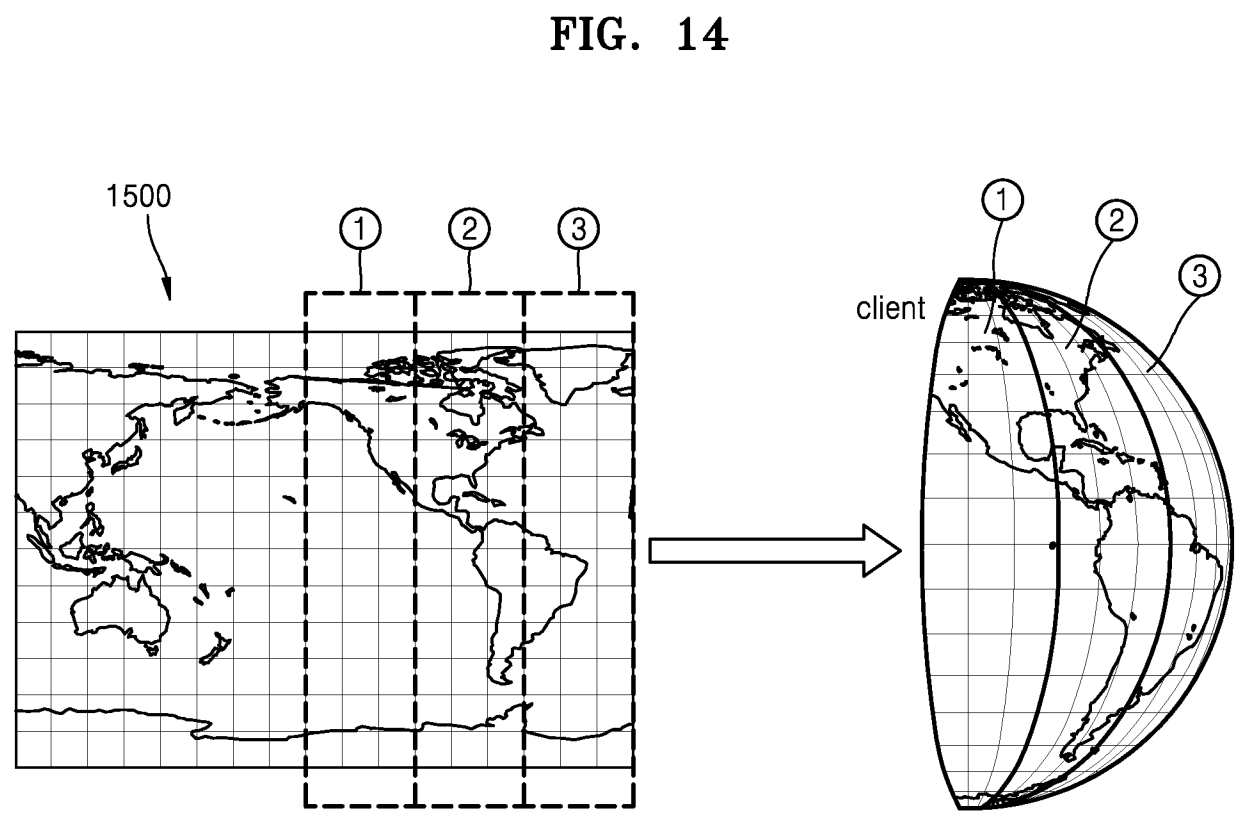

FIG. 14 is a diagram illustrating a process, performed by the example edge data network 2000, of transmitting, to the example electronic device 1000, a first partial image in several data units, according to various embodiments.

The edge data network 2000 may divide a VR image 1500 in the vertical direction (e.g., the longitude) to obtain several data units, select one or more data units ①, ②, and ③ as much as required FoVs, from among the several data units in a process of obtaining the first partial image, encode the selected one or more data units, and transmit, to the electronic device 1000, a result of the encoding.

Figure 15:
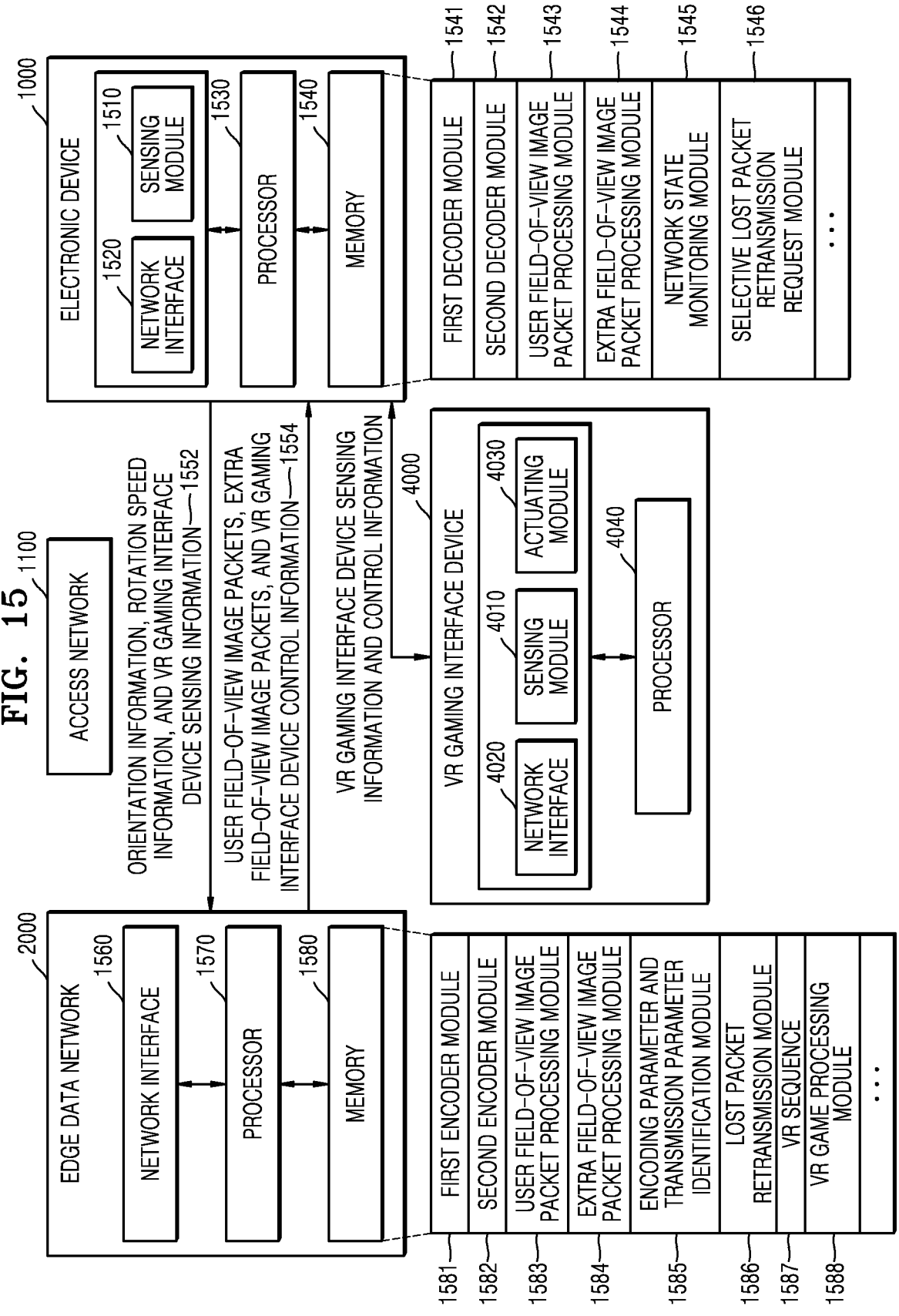
FIG. 15 is a diagram schematically illustrating an operation procedure between an example electronic device, an example edge data network, and an example virtual reality (VR) gaming interface device according to various embodiments.

FIG. 15 is a diagram schematically illustrating an operation procedure between an example electronic device, an example edge data network, and an example VR gaming interface device according to various embodiments.

FIG. 15 further illustrates a VR gaming interface device 4000 in addition to the components of FIG. 4. In the VR gaming field, unlike the VR streaming field, user interaction is involved, and accordingly, the VR gaming interface device 4000 may be used in addition to the electronic device 1000.

The operation procedure between the electronic device and the edge data network in the VR streaming field is described above with reference to FIG. 4, and thus redundant descriptions are not repeated, and the operation procedure between the electronic device, the edge data network, and the VR gaming interface device in the VR gaming field is hereinafter described.

The edge data network 2000 may generate a VR game image (an interactive VR image) included in a VR sequence based on instructions of a VR game processing module 1588.

In detail, the VR game processing module 1588 may store instructions for generating the first partial image of the VR game image based on orientation information, rotation speed information, and VR gaming interface device sensing information 1552. The VR game processing module 1588 may store instructions for outputting VR gaming interface device control information 1554.

The electronic device 1000 may transmit the VR gaming interface device sensing information 1552 to the edge data network 2000 for VR game processing. In this case, the electronic device 1000 may receive the VR gaming interface device sensing information from the VR gaming interface device 4000.

The VR gaming interface device 4000 may include a network interface 4020, a sensing module 4010, and an actuating module 4030. The network interface 4020 may be a module for communicating with the outside, and the sensing module 4010 may be a module for sensing a motion of a user. The sensing module 4010 may obtain the VR gaming interface device sensing information.

The actuating module 4030 may be a module that provides the user with various types of outputs (e.g., haptic feedback), such as a vibration. The actuating module 4030 may provide the user with various types of outputs to the user based on VR gaming interface device sensing control information.

The VR gaming interface device 4000 may transmit the VR gaming interface device sensing information to the electronic device 1000. In addition, the VR gaming interface device 4000 may receive the VR gaming interface device control information from the electronic device 1000.

It is described above that the VR interface device sensing information may be transmitted to the edge data network 2000 via the electronic device 1000, and the VR interface device sensing information and the VR gaming interface device control information may be transmitted to the VR gaming interface device 4000 via the electronic device 1000, but the present disclosure is not limited thereto, and they may be directly exchanged between the VR gaming interface device 4000 and the edge data network 2000. In this case, synchronization information for synchronization with the electronic device 1000 may be also transmitted.

Although the operation procedure between the electronic device, the edge data network, and the VR gaming interface device in the VR gaming field is described above with respect to FIG. 15, the present disclosure is not limited thereto, and it will be understood by those of skill in the art that interactive VR may be mainly utilized in many fields in which a user may directly intervene in content and perform activities, e.g., simulation, training, or the like.

Figure 16:
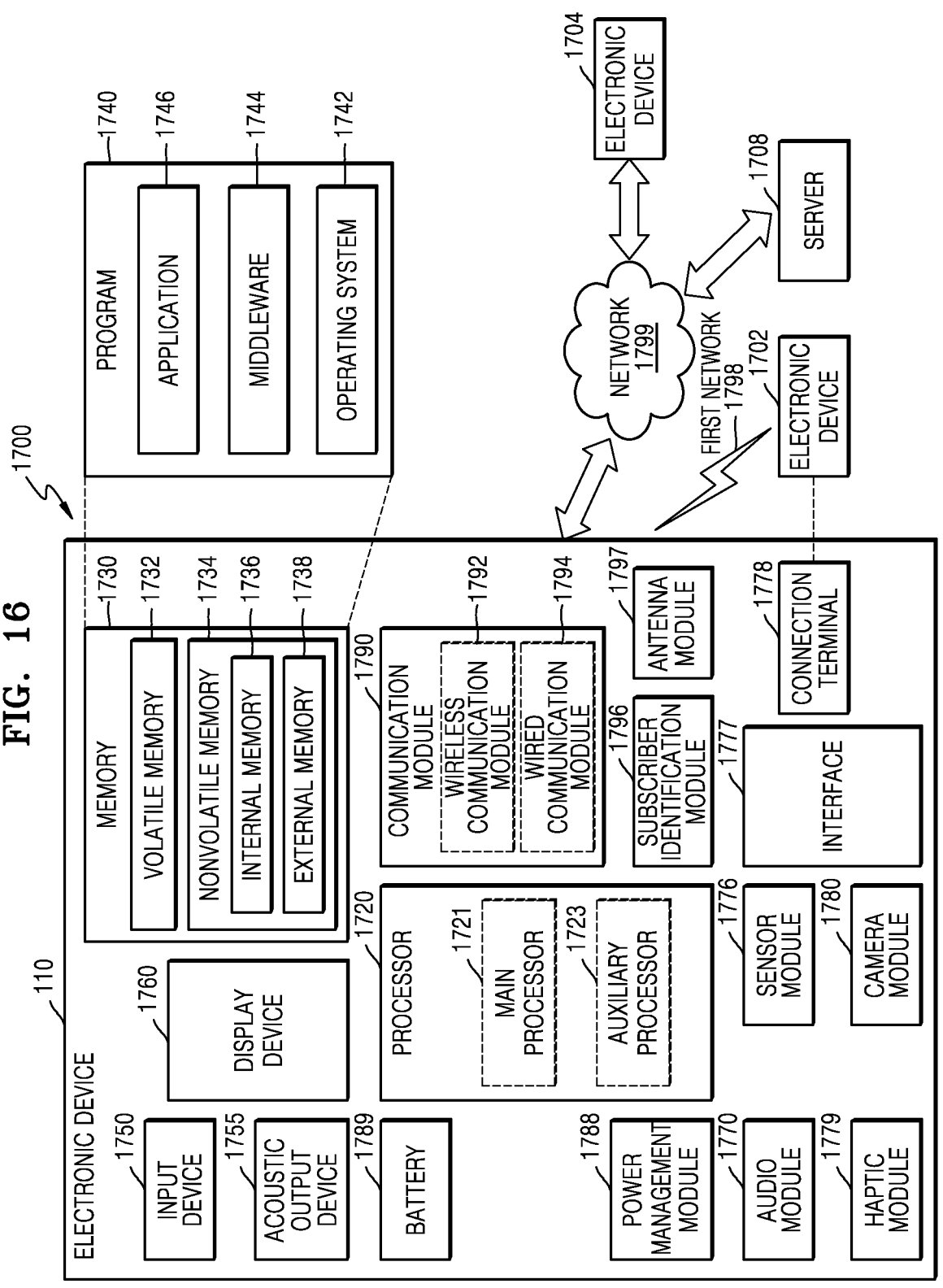
FIG. 16 is a block diagram of an example electronic device according to various embodiments.

FIG. 16 is a block diagram of an example electronic device according to various embodiments.

The electronic device connected to the edge data network of FIGS. 1 to 15 may correspond to the electronic device 110 of FIG. 16. For example, in the network environment 100, an electronic device 110 may communicate with an electronic device 1702 (here, the electronic device includes the VR gaming interface device) via a first network 1798 (e.g., a short-range wireless communication network), or may communicate with an electronic device 1704 or a server 1708 via a second network 1799 (e.g., a long-range wireless communication network). According to an embodiment, the electronic device 110 may communicate with the electronic device 1704 via the server 1708. According to an embodiment, the electronic device 110 may include a processor 1720, a memory 1730, an input device 1750, an acoustic output device 1755, a display device 1760, an audio module 1770, a sensor module 1776, an interface 1777, a connection terminal 1778, a haptic module 1779, a camera module 1780, a power management module 1788, a battery 1789, a communication module 1790, a subscriber identification module 1796, or an antenna module 1797. In various embodiments, in the electronic device 110, at least one (e.g., the display device 1760 or the camera module 1780) of the components may be omitted, or one or more other components may be further included. In various embodiments of the present disclosure, some of the components may be implemented as an integrated circuit. For example, the sensor module 1776 (e.g., a fingerprint sensor, an iris sensor, or an illuminance sensor) may be implemented by being embedded in the display device 1760 (e.g., a display).

The processor 1720 may execute, for example, software (e.g., a program 1740) to control at least one other component (e.g., a hardware or software component) of the electronic device 110, which is connected to the processor 1720, and perform various types of data processing or computation. According to an embodiment, as at least a portion of the data processing or computation, the processor 1720 may load, in a volatile memory 1732, a command or data received from another component (e.g., the sensor module 1776 or the communication module 1790), process the command or data stored in the volatile memory 1732, and store result data in a nonvolatile memory 1734.

According to an embodiment, the processor 1720 may execute an application client, and according to the execution of the application client, the processor 1720 may transmit, to the edge data network 2000, a request message for checking a network protocol to be used by the application client. In addition, the processor 1720 may receive, from the edge data network 2000, a response message indicating the network protocol to be used by the application client. The processor 1720 may update a network protocol to be used by a UE application, based on the response message. The processor 1720 may select a network socket corresponding to the updated network protocol. The processor 1720 may receive data generated for the application client, from the edge data network 2000 by using the selected network socket.

According to an embodiment, the processor 1720 may include a main processor 1721 (e.g., a CPU or an application processor (AP)) and an auxiliary processor 1723 (e.g., a graphics processing unit (GPU), an image signal processor (ISP), a sensor hub processor, or a communication processor (CP)) operable independently from or together with the main processor 1721. Additionally or substitutionally, the auxiliary processor 1723 may be configured to use lower power than the main processor 1721 or to be specialized to a designated function. The auxiliary processor 1723 may be implemented separately from or as a part of the main processor 1721.

The auxiliary processor 1723 may control at least some of functions or states related to at least one (e.g., the display device 1760, the sensor module 1776, or the communication module 1790) of the components in the electronic device 110 instead of the main processor 1721 while the main processor 1721 is in an inactive state (e.g., a sleep state) or together with the main processor 1721 while the main processor 1721 is in an active state (e.g., executing an application). According to an embodiment, the auxiliary processor 1723 (e.g., an ISP or a CP) may be implemented as a portion of another component (e.g., the camera module 1780 or the communication module 1790) functionally associated with the auxiliary processor 1723.

The memory 1730 may store various pieces of data to be used by at least one component (e.g., the processor 1720 or the sensor module 1776) in the electronic device 110. The data may include, for example, software (e.g., the program 1740) and input data or output data related to a command associated with the software. The memory 1730 may include the volatile memory 1732 and the nonvolatile memory 1734.

The program 1740 may be stored as software in the memory 1730 and may include, for example, an operating system (OS) 1742, middleware 1744, and an application 1746. In an embodiment, the program 1740 may include the first application client 122 and the second application client 124 of FIG. 1. In addition, the program 1740 may include the edge enabler client 130 of FIG. 1.

The input device 1750 may receive, from the outside of the electronic device 110, a command or data to be used for a component (e.g., the processor 1720) in the electronic device 110.

The acoustic output device 1755 may output an acoustic signal to the outside of the electronic device 110. The acoustic output device 1755 may include, for example, a speaker. The speaker may be used for general purposes, such as reproducing multimedia or record.

The display device 1760 may visually provide information to the outside (e.g., a user) of the electronic device 110. The display device 1760 may include, for example, a display, a hologram device, or a projector and a control circuitry configured to control a corresponding device. According to an embodiment, the display device 1760 may include touch circuitry configured to detect a touch or a sensor circuitry (e.g., a pressure sensor) configured to measure a strength of a force generated by the touch.

The audio module 1770 may convert a sound into an electrical signal or vice versa. According to an embodiment, the audio module 1770 may obtain a sound through the input device 1750 or output a sound through the acoustic output device 1755 or an external electronic device (e.g., the electronic device 1702 (e.g., a speaker or headphones)) directly or wirelessly connected to the electronic device 110.

The sensor module 1776 may detect an operating state (e.g., power or a temperature) of the electronic device 110 or an external environment state (e.g., a user state) and generate an electrical signal or a data value corresponding to the detected state. According to an embodiment, the sensor module 1776 may include, for example, a (image) gesture sensor, a gyro sensor, a barometer sensor, a magnetic sensor, an acceleration sensor, a grip sensor, a proximity sensor, a color sensor (e.g., an RGB(red-green-blue) sensor), an infrared (IR) sensor, a biometric sensor, a temperature sensor, a humidity sensor, an illuminance sensor, or sensors related to an autonomous vehicle (e.g., an inertia measurement unit (IMU), a global positioning system (GPS) sensor, a camera, a light imaging detection and ranging (LIDAR) sensor, and a radio detection and ranging (RADAR) sensor).

The interface 1777 may support one or more designated protocols usable to be directly or wirelessly connected to an external electronic device (e.g., the electronic device 1702) of the electronic device 110.

A connection terminal 1778 may include a connector through which the electronic device 110 is physically connectable to an external electronic device (e.g., the electronic device 1702).

The haptic module 1779 may convert an electrical signal into a mechanical stimulus (e.g., vibrations or a motion) or an electrical stimulus of which the user may be aware through a tactile or movement sensation.

The camera module 1780 may capture a still image or a moving image. According to an embodiment, the camera module 1780 may include one or more lenses, image sensors, ISPs, or flashes.

The power management module 1788 may manage power to be supplied to the electronic device 110.

The battery 1789 may supply power to at least one component in the electronic device 110.

The communication module 1790 may establish a direct (e.g., wired) communication channel or a wireless communication channel between the electronic device 110 and an external electronic device (e.g., the electronic device 1702, the electronic device 1704, or the server 1708) and support communication through the established communication channel. The communication module 1790 may include one or more communication processors operating independently from the processor 1720 (e.g., an AP) and supporting direct (e.g., wired) communication or wireless communication. According to an embodiment, the communication module 1790 may include a wireless communication module 1792 (e.g., a cellular communication module, a short-range communication module, or a global navigation satellite system (GNSS) communication module) and a wired communication module 1794 (e.g., a local area network (LAN) communication module or a power line communication module). A corresponding communication module among these communication modules may communicate with an external electronic device over the first network 1798 (e.g., a short-range communication network such as Bluetooth, Wi-Fi direct, or infrared data association (IrDA)) or the second network 1799 (e.g., a long-range communication network such as a cellular network, the Internet, or a computer network (e.g., a LAN or a wide area network (WAN)). These types of communication modules may be integrated into one component (e.g., a single chip) or implemented by a plurality of separate components (e.g., a plurality of chips).

The wireless communication module 1792 may verify or authenticate the electronic device 110 in a communication network such as the first network 1798 or the second network 1799 by using subscriber information (e.g., an international mobile subscriber identity (IMSI)) stored in the subscriber identification module 1796.

The antenna module 1797 may transmit a signal or power to the outside (e.g., an external electronic device) or receive a signal or power from the outside.

At least some of the components may be connected to each other in a peripheral device communication scheme (e.g., a bus, a general-purpose input and output (GPIO), a serial peripheral interface (SPI), or a mobile industry processor interface (MIPI)) and exchange a signal (e.g., a command or data) with each other.

According to an embodiment, a command or data may be transmitted or received between the electronic device 110 and the external electronic device 1704 via the server 1708 connected over the second network 1799. Each of the electronic devices 1702 and 1704 may be the same or different type as or from that of the electronic device 110.

According to an embodiment, all or some of operations executed by the electronic device 110 may be executed by one or more external devices among the electronic devices 1702 and 1704 and the server 1708. For example, when the electronic device 110 is supposed to perform a certain function or service automatically or in response to a request from a user or another device, the electronic device 110 may request one or more of the external electronic devices 1702 and 1704 to perform at least a portion of the function or service, additionally or instead of autonomously executing the function or the service. The one or more of the external electronic devices 1702 and 1704 having received the request may execute at least a portion of the requested function or service or an additional function or service related to the request and deliver a result of the execution to the electronic device 110. The electronic device 110 may process the result as it is or additionally and provide the processing result as at least a portion of a response to the request. To this end, for example, cloud computing, distributed computing, or client-server computing may be used.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method, performed by an edge data network, of transmitting image content, the method comprising:
   obtaining orientation information from an electronic device connected to the edge data network;
   obtaining a first partial image including a user field-of-view image corresponding to the orientation information and an extra field-of-view image neighboring the user field-of-view image;
   generating a first user field-of-view frame by encoding the user field-of-view image using at least one first encoding parameter;
   generating a first extra field-of-view frame by encoding the extra field-of-view image using at least one second encoding parameter;
   transmitting, to the electronic device, user field-of-view image packets including user field-of-view frame packets including information about the first user field-of-view frame, and first transmission error control packets;
   transmitting, to the electronic device, extra field-of-view image packets including extra field-of-view frame packets including information about the first extra field-of-view frame, and second transmission error control packets;
   receiving, from the electronic device, a request for retransmission of a user field-of-view packet that the electronic device fails to recover; and
   based on the request for retransmission, retransmitting, to the electronic device, the user field-of-view packet that the electronic device fails to recover,
   wherein the request for retransmission is received from the electronic device when it is predicted that the user field-of-view packet that the electronic device fails to recover can be received before completion of decoding of the first user field-of-view frame, and based on a result of identifying, by the electronic device, whether at least a part of an area related to the user field-of-view packet that the electronic device fails to recover is included in a latest user field-of-view area based on latest orientation information of the electronic device.

2. The method of claim 1, wherein the user field-of-view image comprises an image having a user field-of-view, which is identified based on information about a viewport area of a display of the electronic device, with respect to a position in a virtual reality (VR) image indicated by the orientation information, and
   the extra field-of-view image is an image having an extra field-of-view in up, down, left, and right directions of the user field-of-view image.

3. The method of claim 1, wherein the first partial image comprises a partial image in a first VR image having a certain frame index of a VR sequence including a plurality of frames, and the first partial image is related to the orientation information indicating a position of the partial image.

4. The method of claim 1, wherein the user field-of-view image packets are transmitted to the electronic device through a first transport channel, and the extra field-of-view image packets are transmitted to the electronic device through a second transport channel, and
   the first and second transmission error control packets are forward error correction (FEC) packets.

5. The method of claim 4, wherein the first encoding parameter and the second encoding parameter are at least one of a bit rate, a frame rate, or a resolution, which are identified based on at least one of a required latency, an available bandwidth, a number of consecutive lost packets, a packet loss rate, or a round trip time (RTT), and
   transmission parameters including at least one of an FEC code rate or an FEC block size, which are related to the FEC packets, include at least one of an FEC code rate or an FEC block size, which are identified based on at least one of a required latency, an available bandwidth, a number of consecutive lost packets, a packet loss rate, or an RTT.

6. The method of claim 4, wherein the transmitting of the user field-of-view image packets to the electronic device comprises:
   based on a packet loss rate, a number of consecutive lost packets, an available bandwidth, and a required time period based on a frame rate and a required latency, identifying source packets including at least some of the user field-of-view frame packets, a size of an FEC block including the FEC packets, and an FEC code rate indicating a ratio of the source packets to the FEC block;
   identifying a number of FEC blocks based on a number of the user field-of-view frame packets and a number of the source packets;
   based on the number of the FEC blocks, modifying the number of source packets included in each FEC block; and
   based on the modified number of the source packets included in each FEC block, obtaining the FEC blocks.

7. The method of claim 6, wherein a frame rate of the first user field-of-view frame and a bit rate per frame of the first user field-of-view frame are identified based on the FEC code rate, Rfps, Rfbr, and an available bandwidth of the electronic device, wherein Rfps denotes a frame rate of the first extra field-of-view frame compared to the first user field-of-view frame, and Rfbr denotes a bit rate per frame of the first extra field-of-view frame compared to the first user field-of-view frame, the frame rate of the first extra field-of-view frame is identified based on a frame rate of a user field-of-view area and Rfps, and the bit rate per frame of the first user field-of-view frame is identified based on the bit rate per frame of the first extra field-of-view frame and Rfbr.

8. The method of claim 1, wherein the request for retransmission is further based on at least one of a number of the packet that the electronic device fails to recover among the user field-of-view frame packets, a time period remaining until decoding of the user field-of-view image related to the packet that the electronic device fails to recover, or an RTT.

9. The method of claim 1, wherein state information is received from the electronic device when the edge data network is connected to the electronic device every first period, the state information including at least one of information about a viewport area of a display of the electronic device, information about a frame rate of the first extra field-of-view frame compared to the first user field-of-view frame, information about a bit rate per frame of the first extra field-of-view frame compared to the first user field-of-view frame, or information about a required latency, channel state information is received from the electronic device every second period, the channel state information indicating at least one of a number of consecutive lost packets, a packet loss rate, or an available bandwidth, and periodically measured RTT information is received from the electronic device every third period.

10. The method of claim 1, wherein the first partial image comprises data units of a preset field-of-view range, the generating of the first user field-of-view frame comprises:

obtaining a first data unit of at least one preset field-of-view range corresponding to the user field-of-view image in the first partial image; and generating the first user field-of-view frame by encoding the first data unit of the at least one preset field-of-view range, and the generating of the first extra field-of-view frame comprises:

obtaining a second data unit of at least one preset field-of-view range corresponding to the extra field-of-view image in the first partial image; and generating the first extra field-of-view frame by encoding the second data unit of the at least one preset field-of-view range.

11. The method of claim 1, wherein a time until completion of decoding is determined based on a remaining time of a timer of the electronic device.

12. An edge data network for transmitting image content to an electronic device, the edge data network comprising:

a network interface;

memory storing one or more instructions; and at least one processor, comprising processing circuitry, configured, individually or collectively, to execute the one or more instructions and to control the edge data network to:

obtain orientation information from an electronic device connected to the edge data network, obtain a first partial image including a user field-of-view image corresponding to the orientation information and an extra field-of-view image neighboring the user field-of-view image, generate a first user field-of-view frame by encoding the user field-of-view image using at least one first encoding parameter, generate a first extra field-of-view frame by encoding the extra field-of-view image using at least one second encoding parameter, transmit, to the electronic device, user field-of-view image packets including user field-of-view frame packets including information about the first user field-of-view frame, and first transmission error control packets, transmit, to the electronic device, extra field-of-view image packets including extra field-of-view frame packets including information about the first extra field-of-view frame, and second transmission error control packets, receive, from the electronic device, a request for retransmission of a user field-of-view packet that the electronic device fails to recover, and based on the request for retransmission, retransmit, to the electronic device, the user field-of-view packet that the electronic device fails to recover, wherein the request for retransmission is received from the electronic device when it is predicted that the user field-of-view packet that the electronic device fails to recover can be received before completion of decoding of the first user field-of-view frame, and based on a result of identifying, by the electronic device, whether at least a part of an area related to the user field-of-view packet that the electronic device fails to recover is included in a latest user field-of-view area based on latest orientation information of the electronic device.

13. The edge data network of claim 12, wherein the user field-of-view image packets are transmitted to the electronic device through a first communication channel, and the extra field-of-view image packets are transmitted to the electronic device through a second communication channel, and the first and second transmission error control packets are forward error correction (FEC) packets.

14. The edge data network of claim 13, wherein the first encoding parameter and the second encoding parameter are at least one of a bit rate, a frame rate, or a resolution, which are identified based on at least one of a required latency, an available bandwidth, a number of consecutive lost packets, a packet loss rate, or a round trip time (RTT), and transmission parameters including at least one of an FEC code rate or an FEC block size, which are related to the FEC packets, include at least one of an FEC code rate or an FEC block size, which are identified based on at least one of a required latency, an available bandwidth, a number of consecutive lost packets, a packet loss rate, or an RTT.

15. The edge data network of claim 13, wherein the request for retransmission is further based on at least one of a number of the packet that the electronic device fails to recover among the user field-of-view frame packets, a time period remaining until decoding of the user field-of-view image including the packet that the electronic device fails to recover, or an RTT.

16. A non-transitory computer-readable storage medium storing instructions which, when executed by at least one processor, cause the at least one processor to control an edge data network to perform operations comprising:

obtaining orientation information from an electronic device connected to the edge data network;

obtaining a first partial image including a user field-of-view image corresponding to the orientation information and an extra field-of-view image neighboring the user field-of-view image;

generating a first user field-of-view frame by encoding the user field-of-view image using at least one first encoding parameter;

generating a first extra field-of-view frame by encoding the extra field-of-view image using at least one second encoding parameter;

transmitting, to the electronic device, user field-of-view image packets including user field-of-view frame packets including information about the first user field-of-view frame, and first transmission error control packets;

transmitting, to the electronic device, extra field-of-view image packets including extra field-of-view frame packets including information about the first extra field-of-view frame, and second transmission error control packets;

receiving, from the electronic device, a request for retransmission of a user field-of-view packet that the electronic device fails to recover; and based on the request for retransmission, retransmitting, to the electronic device, the user field-of-view packet that the electronic device fails to recover, wherein the request for retransmission is received from the electronic device when it is predicted that the user field-of-view packet that the electronic device fails to recover can be received before completion of decoding of the first user field-of-view frame, and based on a result of identifying, by the electronic device, whether at least a part of an area related to the user field-of-view packet that the electronic device fails to recover is included in a latest user field-of-view area based on latest orientation information of the electronic device.

* * * * *